US012690049B2

(12) United States Patent
Ko et al.

(10) Patent No.: US 12,690,049 B2
(45) Date of Patent: Jul. 21, 2026

(54) METHOD AND DEVICE FOR PERFORMING WAKE-UP FOR SL DRX OPERATION IN NR V2X

(71) Applicant: LG ELECTRONICS INC., Seoul (KR)

(72) Inventors: Woosuk Ko, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 496 days.

(21) Appl. No.: 18/249,447

(22) PCT Filed: Oct. 14, 2021

(86) PCT No.: PCT/KR2021/014220
§ 371 (c)(1),
(2) Date: Apr. 18, 2023

(87) PCT Pub. No.: WO2022/086051
PCT Pub. Date: Apr. 28, 2022

(65) Prior Publication Data
US 2023/0389045 A1 Nov. 30, 2023

Related U.S. Application Data

(60) Provisional application No. 63/104,498, filed on Oct. 22, 2020, provisional application No. 63/094,294, (Continued)

(51) Int. Cl.
H04W 72/25 (2023.01)
H04W 72/12 (2023.01)
H04W 76/28 (2018.01)

(52) U.S. Cl.
CPC ........... *H04W 72/25* (2023.01); *H04W 72/12* (2013.01); *H04W 76/28* (2018.02)

(58) Field of Classification Search
CPC ..... H04W 72/25; H04W 72/12; H04W 76/28; H04W 76/11; H04W 4/70;
(Continued)

(56) References Cited

U.S. PATENT DOCUMENTS

2017/0245319 A1 8/2017 Yasukawa et al.
2020/0053647 A1 2/2020 Chae et al.
(Continued)

FOREIGN PATENT DOCUMENTS

EP 3122126 1/2017
EP 3500028 6/2019
(Continued)

OTHER PUBLICATIONS

European Patent Office Application Serial No. 21883122.0, Search Report dated Oct. 22, 2024, 8 pages.
(Continued)

*Primary Examiner* — Nicholas A Jensen
*Assistant Examiner* — Oladiran Gideon Olaleye
(74) *Attorney, Agent, or Firm* — LEE, HONG, DEGERMAN, KANG & WAIMEY

(57) ABSTRACT

Presented in one embodiment is a method by which a first device performs wireless communication. The method may comprise the steps of: transmitting, to a second device, through a physical sidelink control channel (PSCCH), first sidelink control information (SCI) including information for scheduling a physical sidelink shared channel (PSSCH); and transmitting, to the second device, second SCI or data through the PSSCH. For example, the first SCI can include a wake-up indicator signal (WIS) field. For example, an
(Continued)

active time related to sidelink discontinuous reception (SL DRX) can be activated on the basis of the WIS field.

11 Claims, 17 Drawing Sheets

Related U.S. Application Data filed on Oct. 20, 2020, provisional application No. 63/093,745, filed on Oct. 19, 2020, provisional application No. 63/093,743, filed on Oct. 19, 2020.

(58) Field of Classification Search
CPC . H04W 52/0216; H04W 72/40; H04W 76/14; H04W 4/40; H04W 92/18; H04W 52/0229; H04W 52/0248; H04W 72/02; H04W 72/1263; H04W 72/542; Y02D 30/70; H04L 1/1812
USPC .......................................................... 370/329
See application file for complete search history.

(56) References Cited

U.S. PATENT DOCUMENTS

| | | | |
|---|---|---|---|
| 2020/0229171 A1 | 7/2020 | Khoryaev et al. | |
| 2020/0351705 A1* | 11/2020 | Chae | H04L 5/0044 |
| 2021/0259044 A1* | 8/2021 | Islam | H04W 72/535 |
| 2022/0022279 A1* | 1/2022 | Kim | H04W 72/23 |
| 2022/0394810 A1* | 12/2022 | Hong | H04W 72/23 |
| 2023/0066041 A1* | 3/2023 | Guo | H04W 52/0216 |
| 2024/0121782 A1* | 4/2024 | Chae | H04W 72/0446 |
| 2024/0259906 A1* | 8/2024 | Freda | H04W 36/302 |

FOREIGN PATENT DOCUMENTS

| | | |
|---|---|---|
| EP | 3706348 | 9/2020 |
| KR | 1020190039101 | 4/2019 |
| KR | 1020200093517 | 8/2020 |
| WO | 2017-171477 | 10/2017 |
| WO | 2018064477 | 4/2018 |

OTHER PUBLICATIONS

PCT International Application No. PCT/KR2021/014220, International Search Report dated Jan. 7, 2022, 3 pages.

* cited by examiner

Resource grid

A carrier
(up to 3300 subcarriers,
i.e., 275 RBs)

A BWP

1RB=12 subcarriers 1 subcarrier

1 RE 1 symbol k=0 l=0

Figure 15:
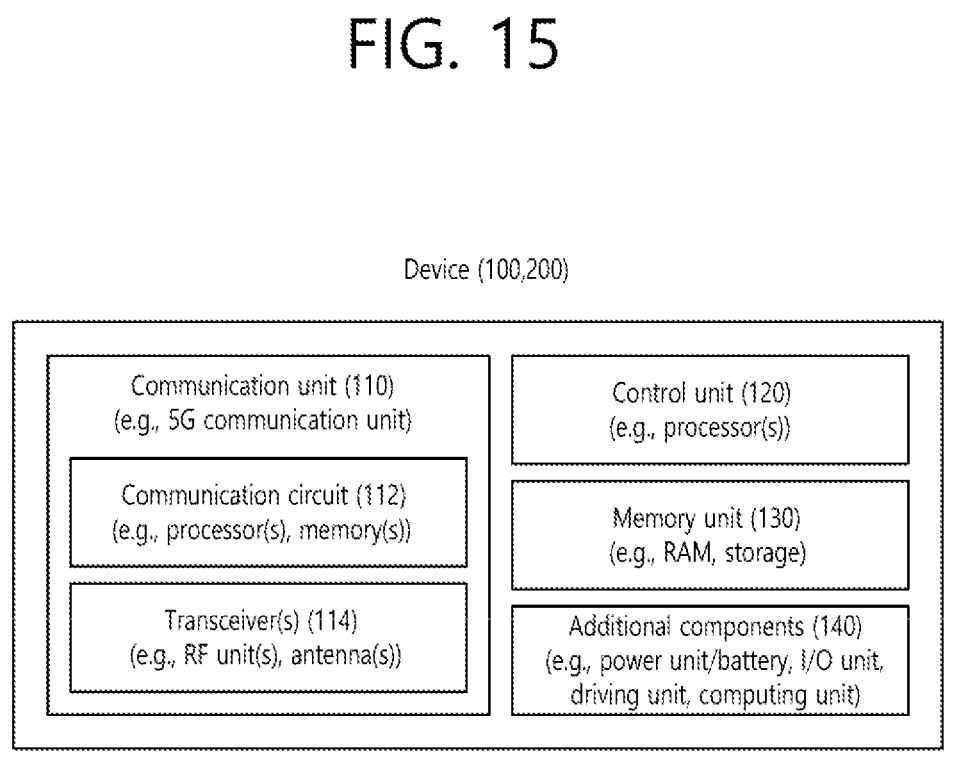

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit,
driving unit, computing unit)

FIG. 17

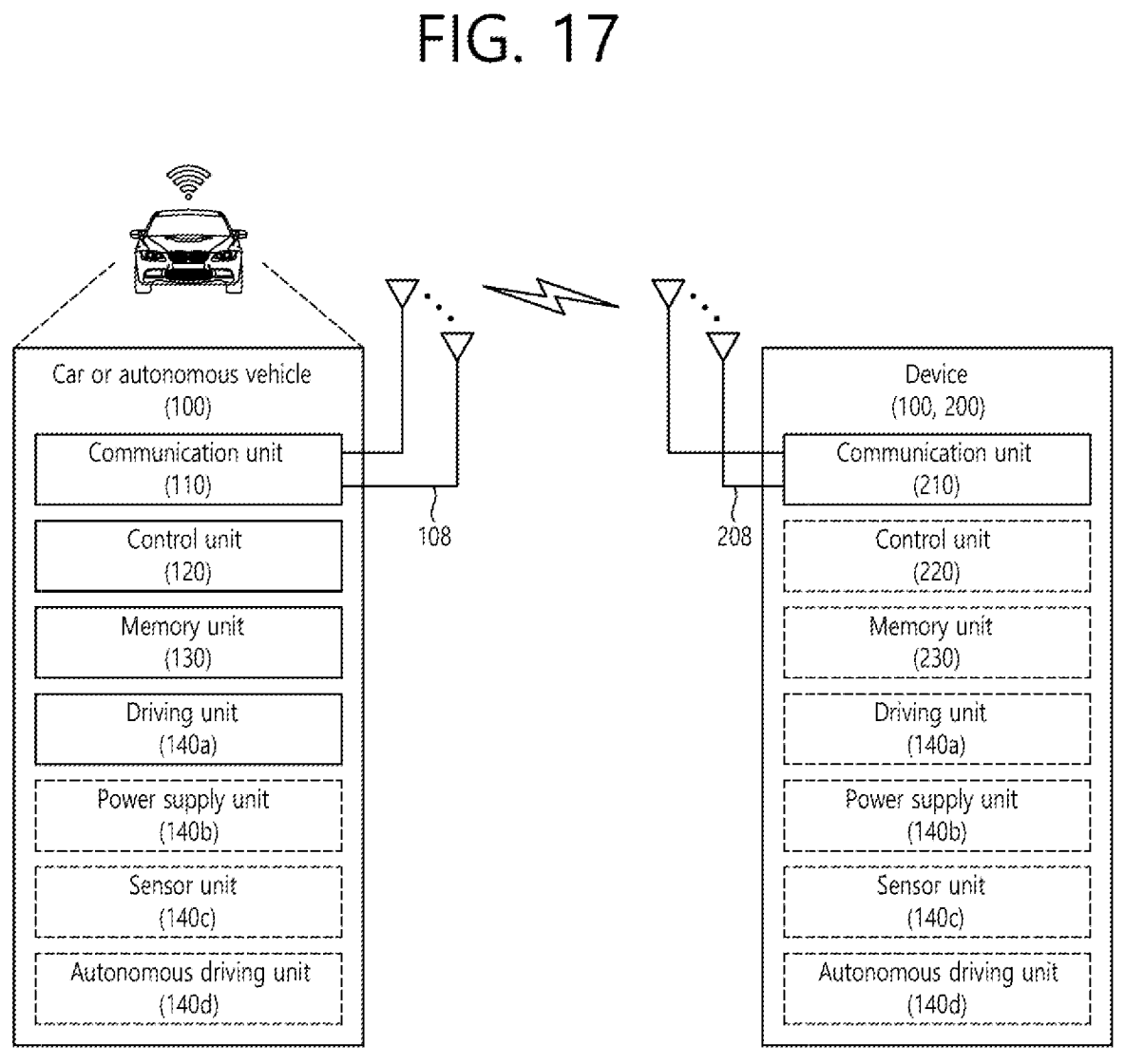

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

208

108

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

1

METHOD AND DEVICE FOR PERFORMING WAKE-UP FOR SL DRX OPERATION IN NR V2X

CROSS-REFERENCE TO RELATED APPLICATION(S)

This application is the National Stage filing under 35 U.S.C. 371 of International Application No. PCT/KR2021/014220, filed on Oct. 14, 2021, which claims the benefit of U.S. Provisional Application No. 63/093,743, filed on Oct. 19, 2020, 63/093,745, filed on Oct. 19, 2020, 63/094,294, filed on Oct. 20, 2020, and 63/104,498, filed on Oct. 22, 2020, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

Meanwhile, in sidelink communication, in the case of a user equipment (UE) used by a vulnerable road user (VRU) performing battery-based operation, since power saving through sidelink (SL) discontinuous reception (DRX) is a very important technical factor for UE operation, DRX operation for sidelink communication may be required. In addition, there may be a problem in that the transmitting UE has to wait until the receiving UE becomes active in order for SL communication with the receiving UE in SL DRX inactive. That is, the transmitting UE performing the SL DRX operation needs to wake-up the receiving UE in SL DRX inactive in order to perform SL communication.

In one embodiment, provided is a method for performing wireless communication by a first device. The method may comprise: transmitting, to a second device, first sidelink control information (SCI) including information for scheduling a physical sidelink shared channel (PSSCH) through a physical sidelink control channel (PSCCH); and transmitting, to the second device, second SCI or data through the PSSCH. For example, the first SCI may include a wake-up indicator signal (WIS) field. For example, an active time related to sidelink (SL) discontinuous reception (DRX) may be activated based on the WIS field.

In one embodiment, provided is a first device adapted to perform wireless communication. The first device may comprise: one or more memories storing instructions; one or more transceivers; and one or more processors connected to the one or more memories and the one or more transceivers. For example, the one or more processors may execute the instructions to: transmit, to a second device, first sidelink control information (SCI) including information for scheduling a physical sidelink shared channel (PSSCH) through a physical sidelink control channel (PSCCH); and transmit, to the second device, second SCI or data through the PSSCH. For example, the first SCI may include a wake-up indicator signal (WIS) field. For example, an active time related to sidelink (SL) discontinuous reception (DRX) may be activated based on the WIS field.

The transmitting UE can obtain a power saving gain by efficiently extending or waking up an active time of a sidelink (SL) discontinuous reception (DRX) cycle of the receiving UE based on a wake-up indicator signal (WIS).

In addition, the transmitting UE transmits the WIS to the receiving UE without waiting until the receiving UE in SL DRX inactive becomes active, thereby reducing latency related to SL communication.

BRIEF DESCRIPTION OF THE DRAWINGS

FIG. 2 shows a radio protocol architecture, based on an embodiment of the present disclosure.

FIG. 4 shows a structure of a slot of an NR frame, based on an embodiment of the present disclosure.

FIG. 15 shows another example of a wireless device, based on an embodiment of the present disclosure.

FIG. 17 shows a vehicle or an autonomous vehicle, based on an embodiment of the present disclosure.

DETAILED DESCRIPTION

Figure 1:
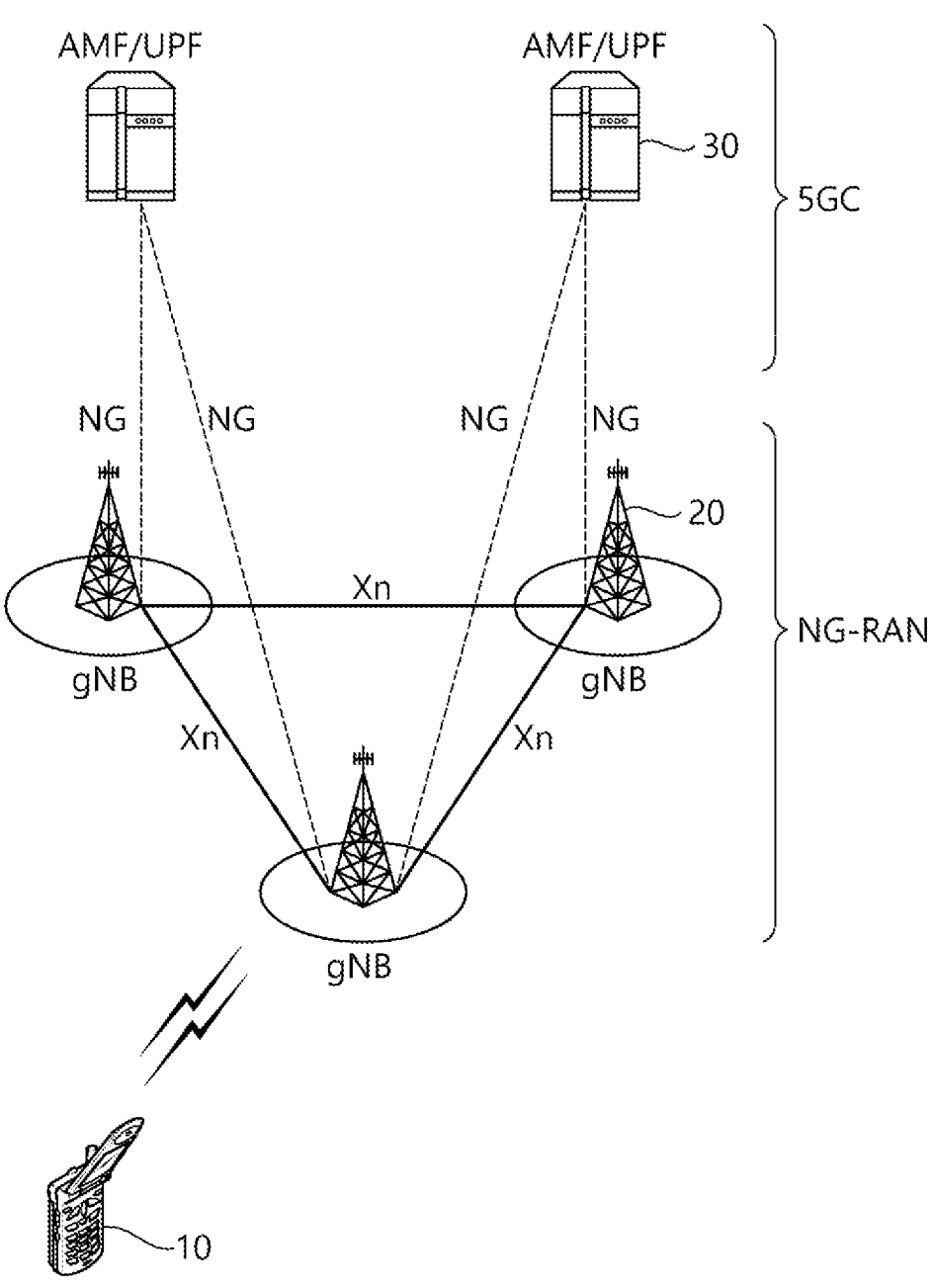
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the documents in Table 1 below may be referred to.

TABLE 1

| 3GPP LTE | 3GPP NR (e.g. 5G) |
|---|---|
| 3GPP TS 36.211: Physical channels and modulation | 3GPP TS 38 211: Physical channels and modulation |
| 3GPP TS 36.212: Multiplexing and channel coding | 3GPP TS 38.212: Multiplexing and channel coding |
| 3GPP TS 36.213: Physical layer procedures | 3GPP TS 38.213: Physical layer procedures for control |
| 3GPP TS 36.214: Physical layer; Measurements | 3GPP TS 38.214: Physical layer procedures for data |
| 3GPP TS 36.300: Overall description | 3GPP TS 38.215: Physical layer measurements |
| 3GPP TS 36.304: User Equipment (UE) procedures in idle mode | |
| 3GPP TS 36.314: Layer 2 - Measurements | 3GPP TS 38.300: Overall description |
| 3GPP TS 36.321: Medium Access Control (MAC) protocol | 3GPP TS 38.304: User Equipment (UE) procedures in idle mode and in RRC inactive state |
| 3GPP TS 36.322: Radio Link Control (RLC) protocol | 3GPP TS 38.321: Medium Access Control |

TABLE 1-continued

| 3GPP LTE | 3GPP NR (e.g. 5G) |
|---|---|
| 3GPP TS 36.323: Packet Data Convergence Protocol (PDCP) 3GPP TS 36.331: Radio Resource Control (RRC) protocol | (MAC) protocol 3GPP TS 38.322: Radio Link Control (RLC) protocol 3GPP TS 38.323: Packet Data Convergence Protocol (PDCP) 3GPP TS 38 331: Radio Resource Control (RRC) protocol 3GPP TS 37.324: Service Data Adaptation Protocol (SDAP) 3GPP TS 37.340: Multi-connectivity; Overall description |

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
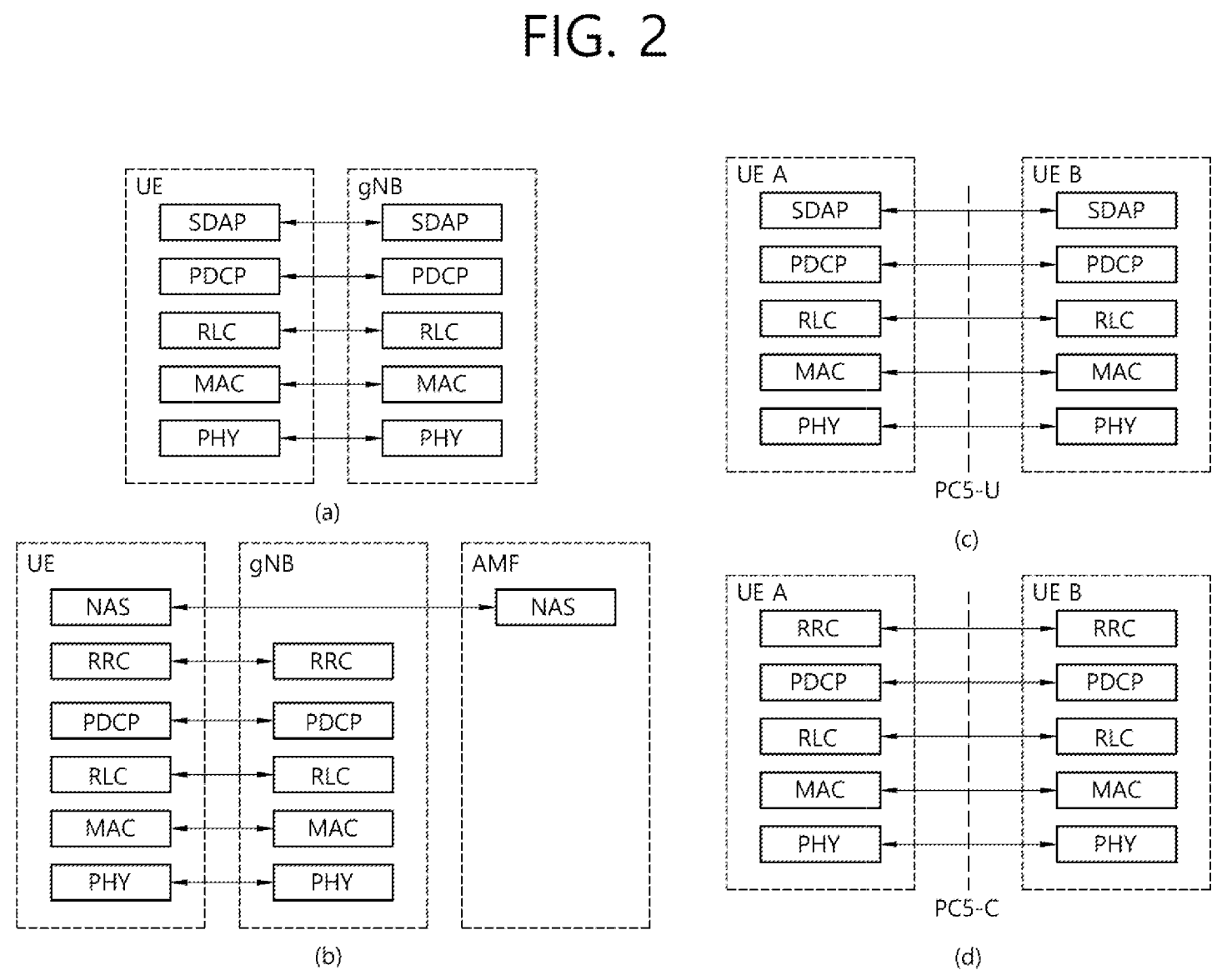

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
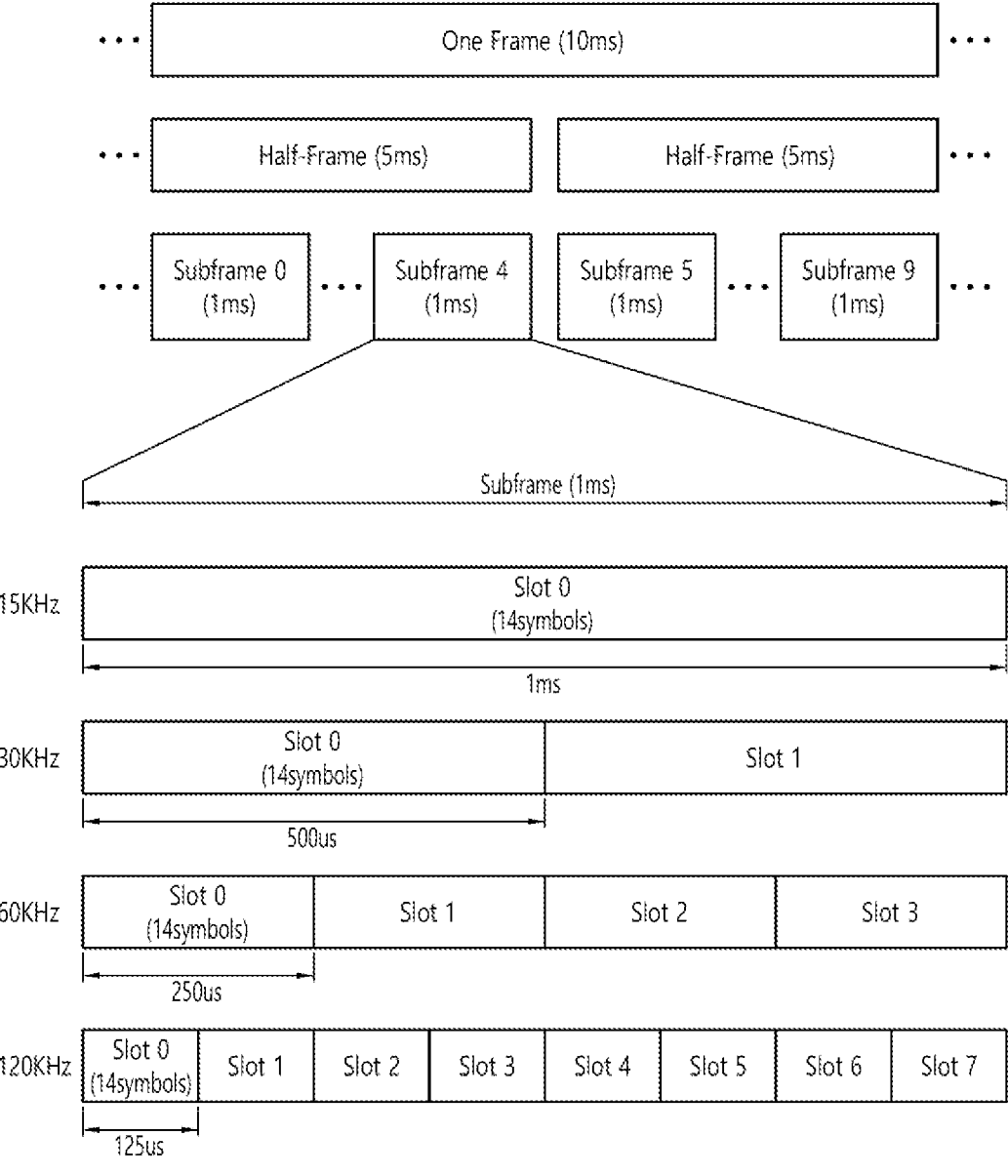
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 2 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 2

| SCS ($15*2^u$) | $N^{slot}_{symb}$ | $N^{frame,\,u}_{slot}$ | $N^{subframe,\,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 3 shows an example of a number of symbols per slot, a number of slots per frame, and a number of slots per subframe based on the SCS, in a case where an extended CP is used.

TABLE 3

| SCS ($15*2^u$) | $N^{slot}_{symb}$ | $N^{frame,\,u}_{slot}$ | $N^{subframe,\,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 4. Among the frequency ranges that are used in an NR system, FR1 may mean a "sub 6 GHz range", and FR2 may mean an "above 6 GHz range" and may also be referred to as a millimeter wave (mmW).

TABLE 4

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 5, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 5

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
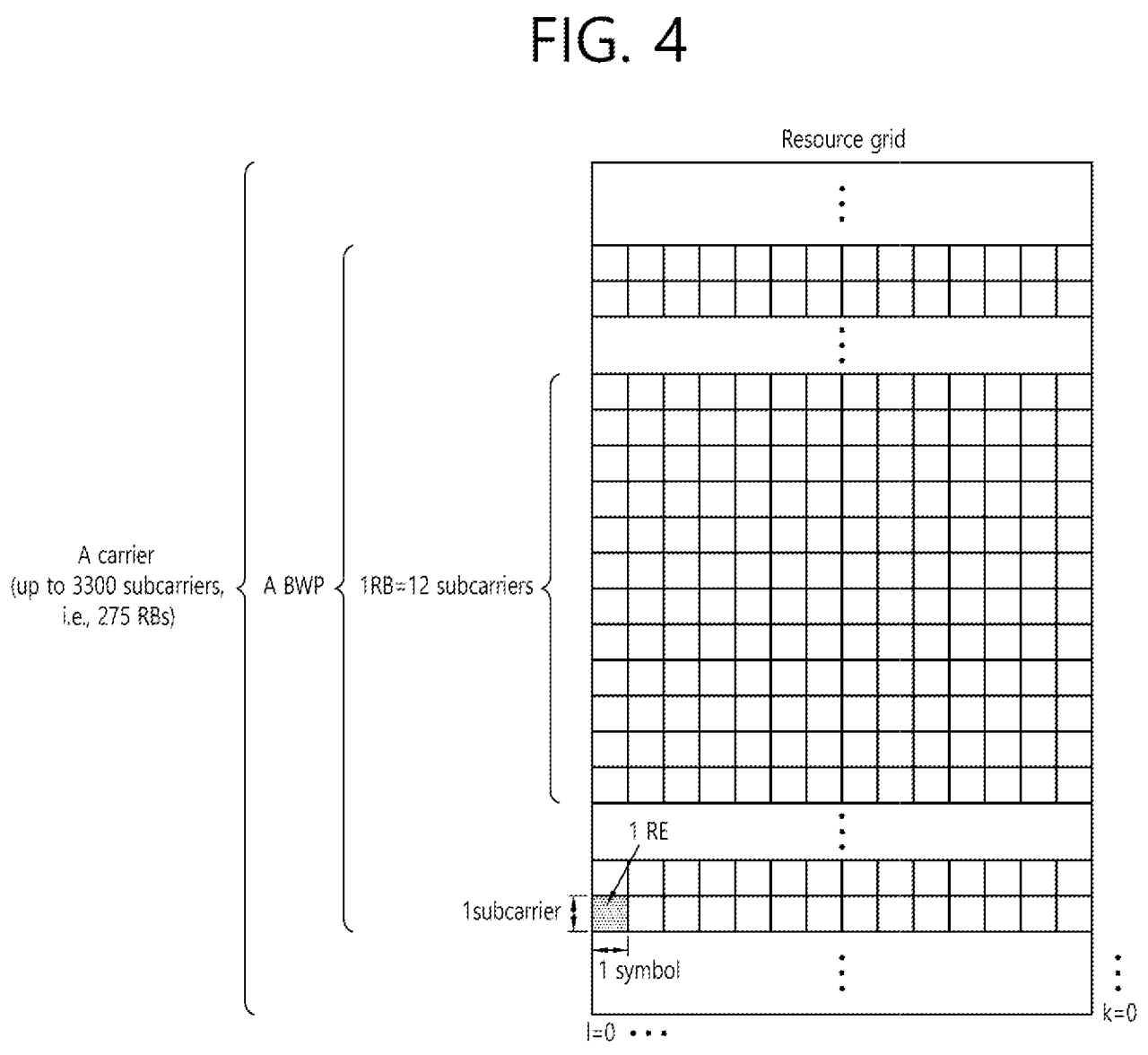

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
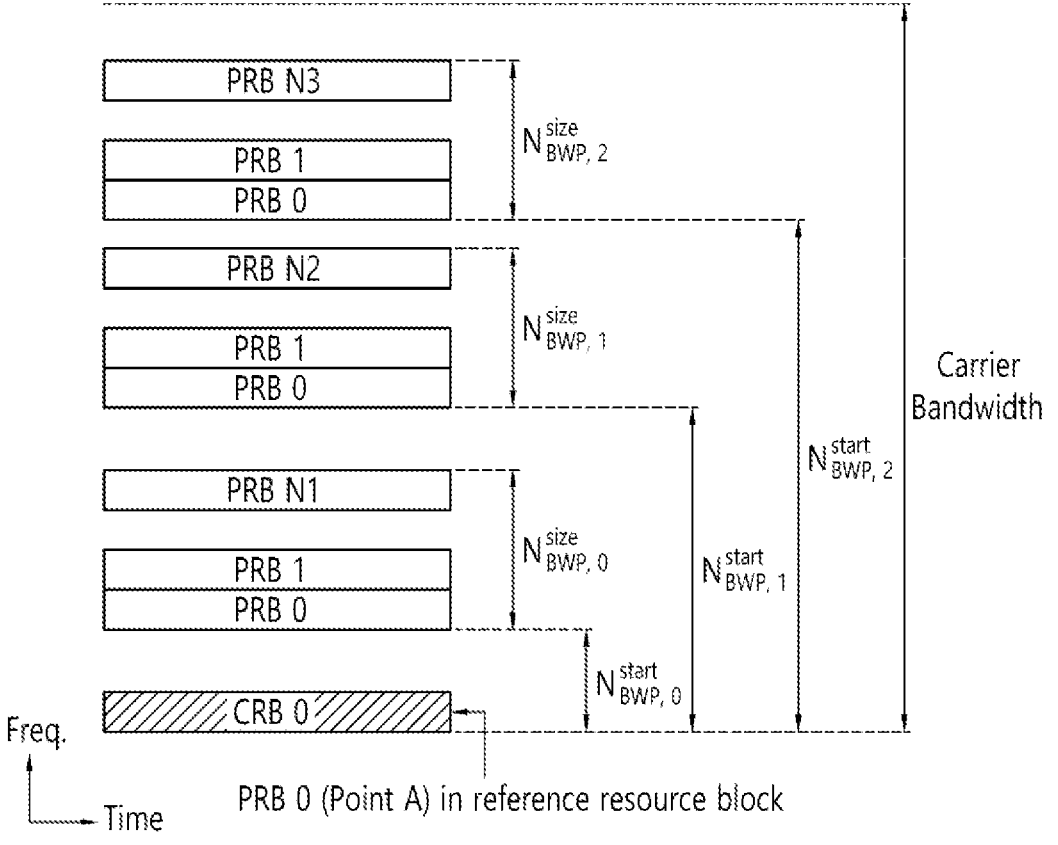
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
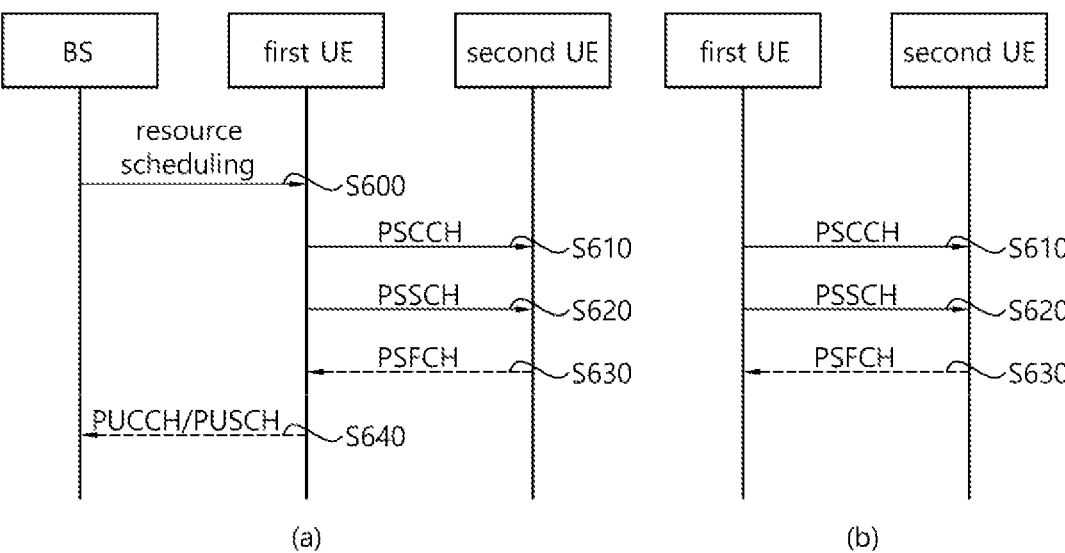
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 6 shows an example of a DCI for SL scheduling.

TABLE 6

| 7.3.1.4.1      Format 3_0 |
| --- |
| DCI format 3_0 is used for scheduling of NR PSCCH and NR PSSCH in one cell.<br>The following information is transmitted by means of the DCI format 3_0 with CRC<br>scrambled by SL-RNTI or SL-CS-RNTI:<br><br>- Resource pool index -$\lceil \log_2 I\rceil$ bits, where I is the number of resource pools for<br>   transmission configured by the higher layer parameter sl-TxPoolScheduling.<br>- Time gap - 3 bits determined by higher layer parameter sl-DCI-ToSL-Trans, as defined<br>   in clause 8.1.2.1 of [6, TS 38.214]<br>- HARQ process number - 4 bits as defined in clause 16.4 of [5, TS 38.213]<br>- New data indicator - 1 bit as defined in clause 16.4 of [5, TS 38.213]<br>- Lowest index of the subchannel allocation to the initial transmission -<br>   $\lceil \log_2(N_{subChannel}^{SL})\rceil$ bits as defined in clause 8.1.2.2 of [6, TS 38.214]<br>- SCI format 1-A fields according to clause 8.3.1.1:<br>   -   Frequency resource assignment.<br>   -   Time resource assignment.<br>- PSFCH-to-HARQ feedback timing indicator -$\lceil \log_2 N_{fb\_timing}\rceil$ bits, where $N_{fb\_timing}$<br>   is the number of entries in the higher layer parameter sl-PSFCH-ToPUCCH, as defined<br>   in clause 16.5 of [5, TS 38.213]<br>- PUCCH resource indicator - 3 bits as defined in clause 16.5 of [5, TS 38.213].<br>- Configuration index - 0 bit if the UE is not configured to monitor DCI format 3_0 with<br>   CRC scrambled by SL-CS-RNTI; otherwise 3 bits as defined in clause 8.1.2 of [6,<br>   TS 38.214]. If the UE is configured to monitor DCI format 3_0 with CRC scrambled by<br>   SL-CS-RNTI, this field is reserved for DCI format 3_0 with CRC scrambled by SL-<br>   RNTI.<br>- Counter sidelink assignment index - 2 bits<br>   -   2 bits as defined in clause 16.5.2 of [5, TS 38.213] if the UE is configured with<br>       pdsch-HARQ-ACK-Codebook = dynamic<br>   -   2 bits as defined in clause 16.5.1 of [5, TS 38.213] if the UE is configured with<br>       pdsch-HARQ-ACK-Codebook = semi-static<br>- Padding bits, if required |

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or $1^{st}$-stage SCI) to a second UE by using the resource(s). In step S620, the first UE may transmit a PSSCH (e.g., $2^{nd}$-stage SCI, MAC PDU, data, etc.) related to the PSCCH to the second UE.

For example, the UE may assist the SL resource selection for another UE. For example, in the NR resource allocation mode 2, the UE may be provided/allocated with a configured grant for SL transmission. For example, in the NR resource allocation mode 2, the UE may schedule SL transmission of another UE. For example, in the NR resource allocation mode 2, the UE may reserve an SL resource for blind retransmission.

For example, in the NR resource allocation mode 2, the UE 1 may use the SCI to indicate a priority of SL transmission to the UE 2. For example, the UE 2 may decode the SCI, and the UE 2 may perform sensing and/or resource (re)selection on the basis of the priority. For example, the resource (re)selection procedure may include a step in which the UE 2 identifies a candidate resource in a resource selection window and a step in which the UE 2 selects a resource for (re)transmission among the identified candidate resources. For example, the resource selection window may be a time interval for selecting a resource for SL transmission by the UE. For example, after the UE 2 triggers resource (re)selection, the resource selection window may start at T1≥0, and the resource selection window may be restricted by a remaining packet delay budget of the UE 2. For example, in the step in which the UE 2 identifies the candidate resource in the resource selection window, if a specific resource is indicated by the SCI received by the UE 2 from the UE 1 and if an L1 SL RSRP threshold for the specific resource exceeds an SL RSRP threshold, the UE 2 may not determine the specific resource as the candidate resource. For example, the SL RSRP threshold may be determined based on a priority of SL transmission indicated by the SCI received by the UE 2 from the UE 1 and a priority of SL transmission on a resource selected by the UE 2.

For example, the L1 SL RSRP may be measured based on an SL demodulation reference signal (DMRS). For example, one or more PSSCH DMRS patterns may be configured or pre-configured in a time domain for each resource pool. For example, a PDSCH DMRS configuration type 1 and/or type 2 may be identical or similar to a frequency domain pattern of the PSSCH DMRS. For example, a correct DMRS pattern may be indicated by the SCI. For example, in the NR resource allocation mode 2, the transmitting UE may select a specific DMRS pattern from among configured or pre-configured DMRS patterns for the resource pool.

For example, in the NR resource allocation mode 2, the transmitting UE may perform initial transmission of a transport block (TB) without reservation, based on the sensing and resource (re)selection procedure. For example, the transmitting UE may use an SCI related to a first/initial RB to reserve an SL resource for initial transmission of a second TB, based on the sensing and resource (re)selection procedure.

For example, in the NR resource allocation mode 2, the UE may reserve a resource for feedback-based PSSCH retransmission, through signaling related to previous transmission of the same TB. For example, the maximum number of SL resources reserved by one transmission including current transmission may be 2, 3, or 4. For example, the maximum number of SL resources may be identical irrespective of whether HARQ feedback is enabled. For example, the maximum number of HARQ (re)transmissions for one TB may be restricted by a configuration or a pre-configuration. For example, the maximum number of HARQ (re)transmissions may be up to 32. For example, in the absence of the configuration or the pre-configuration, the maximum number of HARQ (re)transmissions may not be designated. For example, the configuration or the pre-configuration may be for the transmitting UE. For example, in the NR resource allocation mode 2, HARQ feedback for releasing a resource not used by the UE may be supported.

For example, in the NR resource allocation mode 2, the UE may use the SCI to indicate to another UE one or more sub-channels and/or slots used by the UE. For example, the UE may use the SCI to indicate to another UE one or more sub-channels and/or slots reserved by the UE for PSSCH (re)transmission. For example, a minimum allocation unit of an SL resource may be a $\text{slot}_{symb}$. For example, a size of a sub-channel may be configured for the UE or may be pre-configured.

In step S630, the first UE may receive a PSFCH related to the PSCCH/PSSCH from the second UE. Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st}$-stage SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B. Tables 7A-7B show an example of the $1^{st}$-stage SCI format.

TABLE 7A

| 3GPP TS 38.212 |
| --- |

8.3.1.1 SCI format 1-A
SCI format 1-A is used for the scheduling of PSSCH and $2^{nd}$-stage-SCI on PSSCH
The following information is transmitted by means of the SCI format 1-A:
  Priority - 3 bits as specified in clause 5.4.3.3 of [12, TS 23.287] and
  clause 5.22.1.3.1 of [8, TS 38.321].

Frequency resource assignment - $\left\lceil \log_2\left( \frac{N_{subChannel}^{SL}\left(N_{subChannel}^{SL} + 1\right)}{2} \right) \right\rceil$ bits when the value of the higher layer parameter sl-MaxNumPerReserve
  is configured to 2; otherwise

TABLE 7A-continued

3GPP TS 38.212

$$\left\lceil \log_2 \left( \frac{N_{subChannel}^{SL}(N_{subChannel}^{SL}+1)(2N_{subChannel}^{SL}+1)}{6} \right) \right\rceil$$

bits when the value of the higher layer parameter sl-MaxNumPerRe-serve
is configured to 3, as defined in clause 8.1.2.2 of [6, TS 38.214].
Time resource assignment - 5 bits when the value of the higher layer
parameter sl-MaxNumPerReserve is configured to 2; otherwise 9 bits
when the value of the higher layer parameter sl-MaxNumPerReserve is
configured to 3, as defined in clause 8.1.2.1 of [6, TS 38.214].

TABLE 7B

2$^{nd}$-stage SCI formats

| Value of 2nd-stage SCI format field | 2nd-stage SCI format field |
|---|---|
| 00 | SCI format 2-A |
| 01 | SCI format 2-B |
| 10 | Reserved |
| 11 | Reserved |

Tables 8A-8B show an example of the 2$^{nd}$-stage SCI format.

TABLE 8A

3GPP TS 38.212

8.4.1.1   SCI format 2-A
SCI format 2-A is used for the decoding of PSSCH, with HARQ operation when HARQ-ACK information
includes ACK or NACK, when HARQ-ACK information includes only NACK, or when there is no feedback
of HARQ-ACK information.
The following information is transmitted by means of the SCI format 2-A:
   -   HARQ process number - 4 bits as defined in clause 16.4 of [5, TS 38.213].
   -   New data indicator - 1 bit as defined in clause 16.4 of [5, TS 38.213].
   -   Redundancy version - 2 bits as defined in clause 16.4 of [6, TS 38.214].
   -   Source ID - 8 bits as defined in clause 8.1 of [6, TS 38.214].
   -   Destination ID - 16 bits as defined in clause 8.1 of [6, TS 38.214].
   -   HARQ feedback enabled/disabled indicator - 1 bit as defined in clause 16.3 of [5, TS 38.213].
   -   Cast type indicator - 2 bits as defined in Table 8.4.1.1-1.
   -   CSI request - 1 bit as defined in clause 8.2.1 of [6, TS 38.214].
8.4.1.2     SCI format 2-B
SCI format 2-B is used for the decoding of PSSCH, with HARQ operation when HARQ-ACK information
includes only NACK, or when there is no feedback of HARQ-ACK information.
The following information is transmitted by means of the SCI format 2-B:
   -   HARQ process number - 4 bits as defined in clause 16.4 of [5, TS 38.213].
   -   New data indicator - 1 bit as defined in clause 16.4 of [5, TS 38.213].
   -   Redundancy version - 2 bits as defined in clause 16.4 of [6, TS 38.214].
   -   Source ID - 8 bits as defined in clause 8.1 of [6, TS 38.214].
   -   Destination ID - 16 bits as defined in clause 8.1 of [6, TS 38.214].
   -   HARQ feedback enabled/disabled indicator - 1 bit as defined in clause 16.3 of [5, TS 38.213].
   -   Zone ID - 12 bits as defined in clause 5.8.11 of [9, TS 38.331].
   -   Communication range requirement - 4 bits determined by higher layer parameter sl-
ZoneConfigMCR-Index.

TABLE 7A-continued

3GPP TS 38.212

Resource reservation period - $\lceil \log_2 N_{rsv\_period} \rceil$ bits as defined in clause
8.1.4 of [6, TS 38.214], where $N_{rsv\_period}$ is the number of entries in the
higher layer parameter sl-ResourceReservePeriodList, if higher layer
parameter sl-MultiReserveResource is configured; 0 bit otherwise.
DMRS pattern - $\lceil \log_2 N_{pattern} \rceil$ bits as defined in clause 8.4.1.1.2 of
[4, TS 38.211], where $N_{pattern}$ is the number of DMRS patterns
configured by higher layer parameter sl-PSSCH-DMRS-
TimePatternList.
2$^{nd}$-stage SCI format - 2 bits as defined in Table 7B.
Beta_offset indicator - 2 bits as provided by higher layer parameter sl-
BetaOffsets2ndSCI and Table 8.3.1.1-2.
Number of DMRS port - 1 bit as defined in Table 8.3.1.1-3.
Modulation and coding scheme - 5 bits as defined in clause 8.1.3 of [6,
TS 38.214].
Additional MCS table indicator - as defined in clause 8.1.3.1 of [6, TS
38.214]: 1 bit if one MCS table is configured by higher layer parameter
sl-Additional-MCS-Table; 2 bits if two MCS tables are configured by
higher layer parameter sl-Additional-MCS-Table; 0 bit otherwise.
PSFCH overhead indication - 1 bit as defined clause 8.1.3.2 of [6, TS
38.214] if higher layer parameter sl-PSFCH-Period = 2 or 4; 0 bit
otherwise.
Reserved - a number of bits as determined by higher layer parameter sl-
NumReservedBits, with value set to zero.

TABLE 8B

Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource. Referring to (a) of FIG. 6, in step S640, the first UE may transmit SL HARQ feedback to the base station through the PUCCH and/or the PUSCH.

Figure 7:
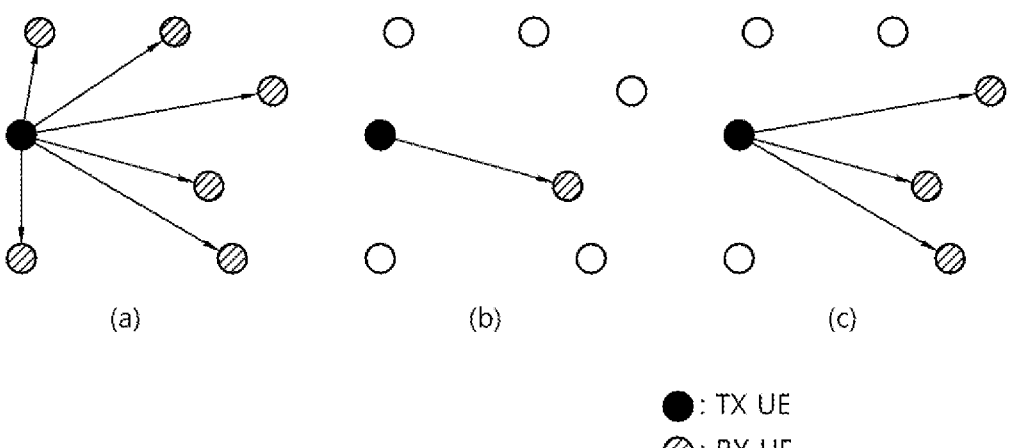
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Table 9 shows an example of SL CBR and SL RSSI.

TABLE 9

| | SL CBR |
| --- | --- |
| Definition | SL Channel Busy Ratio (SL CBR) measured in slot n is defined as the portion of sub-channels in the resource pool whose SL RSSI measured by the UE exceed a (pre-)configured threshold sensed over a CBR measurement window [n − a, n − 1], wherein a is equal to 100 or 100 · $2^\mu$ slots, according to higher layer parameter timeWindowSize-CBR. |
| Applicable for | RRC_IDLE intra-frequency, RRC_IDLE inter-frequency, RRC_CONNECTED intra-frequency, RRC_CONNECTED inter-frequency |
| | SL RSSI |
| Definition | Sidelink Received Signal Strength Indicator (SL RSSI) is defined as the linear average of the total received power (in [W]) observed in the configured sub-channel in OFDM symbols of a slot configured for PSCCH and PSSCH, starting from the $2^{nd}$ OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. |
| Applicable for | RRC_IDLE intra-frequency, RRC_IDLE inter-frequency, RRC_CONNECTED intra-frequency, RRC_CONNECTED inter-frequency |

Tables 10 to 13 show examples of DRX.

TABLE 10

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1:       If Sidelink resource allocation mode 1 is configured by RRC, a DRX functionality is not configured.

RRC controls DRX operation by configuring the following parameters:

-     drx-onDurationTimer: the duration at the beginning of a DRX cycle;
-     drx-SlotOffset: the delay before starting the drx-onDurationTimer;
-     drx-InactivityTimer: the duration after the PDCCH occasion in which a PDCCH indicates a new UL or DL transmission for the MAC entity;
-     drx-RetransmissionTimerDL (per DL HARQ process except for the broadcast process): the maximum duration until a DL retransmission is received;
-     drx-RetransmissionTimerUL (per UL HARQ process): the maximum duration until a grant for UL retransmission is received;
-     drx-LongCycleStartOffset: the Long DRX cycle and drx-StartOffset which defines the subframe where the Long and Short DRX cycle starts;
-     drx-ShortCycle (optional): the Short DRX cycle;
-     drx-ShortCycleTimer (optional): the duration the UE shall follow the Short DRX cycle;
-     drx-HARQ-RTT-TimerDL (per DL HARQ process except for the broadcast process): the minimum duration before a DL assignment for HARQ retransmission is expected by the MAC entity;
-     drx-HARQ-RTT-TimerUL (per UL HARQ process): the minimum duration before a UL HARQ retransmission grant is expected by the MAC entity;
-     ps-Wakeup (optional): the configuration to start associated drx-onDurationTimer in case DCP is monitored but not detected;
-     ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

TABLE 10-continued

| - | ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started. |

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx- onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

Referring to Table 10, parameters related to SL DRX may [15] be defined like parameters related to DRX.

TABLE 11

When a DRX cycle is configured, the Active Time for Serving Cells in a DRX group includes the time while:
-     drx-onDurationTimer or drx-InactivityTimer configured for the DRX group is running; or
-     drx-RetransmissionTimerDL or drx-RetransmissionTimerUL is running on any Serving Cell in the DRX group; or
-     ra-ContentionResolutionTimer (as described in clause 5.1.5) or msgB-ResponseWindow (as described in clause 5.1.4a) is running; or
-     a Scheduling Request is sent on PUCCH and is pending (as described in clause 5.4.4); or
-     a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

When DRX is configured, the MAC entity shall:
1>   if a MAC PDU is received in a configured downlink assignment:
    2>   start the drx-HARQ-RTT-TimerDL for the corresponding HARQ process in the first symbol after the end of the corresponding transmission carrying the DL HARQ feedback;
    2>   stop the drx-RetransmissionTimerDL for the corresponding HARQ process.
1>   if a MAC PDU is transmitted in a configured uplink grant and LBT failure indication is not received from lower layers:
    2>   start the drx-HARQ-RTT-TimerUL for the corresponding HARQ process in the first symbol after the end of the first repetition of the corresponding PUSCH transmission;
    2>   stop the drx-RetransmissionTimerUL for the corresponding HARQ process.
1>   if a drx-HARQ-RTT-TimerDL expires:
    2>   if the data of the corresponding HARQ process was not successfully decoded:
        3>     start the drx-RetransmissionTimerDL for the corresponding HARQ process in the first symbol after the expiry of drx-HARQ-RTT-TimerDL.
1>   if a drx-HARQ-RTT-TimerUL expires:
    2>   start the drx-RetransmissionTimerUL for the corresponding HARQ process in the first symbol after the expiry of drx-HARQ-RTT-TimerUL.
1>   if a DRX Command MAC CE or a Long DRX Command MAC CE is received:
    2>   stop drx-onDurationTimer for each DRX group;
    2>   stop drx-InactivityTimer for each DRX group.
1>   if drx-InactivityTimer for a DRX group expires:
    2>   if the Short DRX cycle is configured:
        3>     start or restart drx-ShortCycleTimer for this DRX group in the first symbol after the expiry of drx-InactivityTimer;
        3>     use the Short DRX cycle for this DRX group.
    2>   else:
        3>     use the Long DRX cycle for this DRX group.
1>   if a DRX Command MAC CE is received:
    2>   if the Short DRX cycle is configured:
        3>     start or restart drx-ShortCycleTimer for each DRX group in the first symbol after the end of DRX Command MAC CE reception;
        3>     use the Short DRX cycle for each DRX group.
    2>   else:
        3>     use the Long DRX cycle for each DRX group.

Tables 11 to 13 show an example of an active time for a serving cell for a DRX group if a DRX cycle is configured.

TABLE 12

1> if drx-ShortCycleTimer for a DRX group expires:
    2> use the Long DRX cycle for this DRX group.
1> if a Long DRX Command MAC CE is received:
    2> stop drx-ShortCycleTimer for each DRX group;
    2> use the Long DRX cycle for each DRX group.
1> if the Short DRX cycle is used for a DRX group, and [(SFN × 10) + subframe number] modulo (drx-ShortCycle) = (drx-StartOffset) modulo (drx-ShortCycle):
    2> start drx-onDurationTimer for this DRX group after drx-SlotOffset from the beginning of the subframe.
1> if the Long DRX cycle is used for this DRX group, and [(SFN × 10) + subframe number] modulo (drx-LongCycle) = drx-StartOffset:
    2> if DCP monitoring is configured for the active DL BWP as specified in TS 38.213 [6], clause 10.3:
        3> if DCP indication associated with the current DRX cycle received from lower layer indicated to start drx-onDurationTimer, as specified in TS 38.213 [6]; or
        3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or within BWP switching interruption length, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or
        3> if ps-Wakeup is configured with value true and DCP indication associated with the current DRX cycle has not been received from lower layers:
            4> start drx-onDurationTimer after drx-SlotOffset from the beginning of the subframe.
    2> else:
        3> start drx-onDurationTimer for this DRX group after drx-SlotOffset from the beginning of the subframe.
NOTE 2:     In case of unaligned SFN across carriers in a cell group, the SFN of the SpCell is used to calculate the DRX duration.
1> if a DRX group is in Active Time:
    2> monitor the PDCCH on the Serving Cells in this DRX group as specified in TS 38.213 [6];
    2> if the PDCCH indicates a DL transmission:
        3> start the drx-HARQ-RTT-TimerDL for the corresponding HARQ process in the first symbol after the end of the corresponding transmission carrying the DL HARQ feedback;
NOTE 3:     When HARQ feedback is postponed by PDSCH-to-HARQ_feedback timing indicating a non-numerical k1 value, as specified in TS 38.213 [6], the corresponding transmission opportunity to send the DL HARQ feedback is indicated in a later PDCCH requesting the HARQ-ACK feedback.
        3> stop the drx-RetransmissionTimerDL for the corresponding HARQ process.
        3> if the PDSCH-to-HARQ_feedback timing indicate a non-numerical k1 value as specified in TS 38.213 [6]:
            4> start the drx-RetransmissionTimer DL in the first symbol after the PDSCH transmission for the corresponding HARQ process.
    2> if the PDCCH indicates a UL transmission:
        3> start the drx-HARQ-RTT-TimerUL for the corresponding HARQ process in the first symbol after the end of the first repetition of the corresponding PUSCH transmission;
        3> stop the drx-RetransmissionTimerUL for the corresponding HARQ process.
    2> if the PDCCH indicates a new transmission (DL or UL) on a Serving Cell in this DRX group:
        3> start or restart drx-InactivityTimer for this DRX group in the first symbol after the end of the PDCCH reception.
    2> if a HARQ process receives downlink feedback information and acknowledgement is indicated:
        3> stop the drx-RetransmissionTimerUL for the corresponding HARQ process.

TABLE 13

1>  if DCP monitoring is configured for the active DL BWP as specified in TS 38.213
    [6], clause 10.3; and
1>  if the current symbol n occurs within drx-onDurationTimer duration; and
1>  if drx-onDurationTimer associated with the current DRX cycle is not started as
    specified in this clause:
    2>  if the MAC entity would not be in Active Time considering
        grants/assignments/DRX Command MAC CE/Long DRX Command MAC CE
        received and Scheduling Request sent until 4 ms prior to symbol n when evaluating
        all DRX Active Time conditions as specified in this clause:
        3>  not transmit periodic SRS and semi-persistent SRS defined in TS 38.214 [7];
        3>  not report semi-persistent CSI configured on PUSCH;
        3>  if ps-TransmitPeriodicL1-RSRP is not configured with value true:
            4>  not report periodic CSI that is L1-RSRP on PUCCH.
        3>  if ps-TransmitOtherPeriodicCSI is not configured with value true:
            4>  not report periodic CSI that is not L1-RSRP on PUCCH.
1>  else:
    2>  in current symbol n, if a DRX group would not be in Active Time considering
        grants/assignments scheduled on Serving Cell(s) in this DRX group and DRX
        Command MAC CE/Long DRX Command MAC CE received and Scheduling
        Request sent until 4 ms prior to symbol n when evaluating all DRX Active Time
        conditions as specified in this clause:
        3>  not transmit periodic SRS and semi-persistent SRS defined in TS 38.214 [7] in
            this DRX group;
        3>  not report CSI on PUCCH and semi-persistent CSI configured on PUSCH in
            this DRX group.
    2>  if CSI masking (csi-Mask) is setup by upper layers:
        3>  in current symbol n, if drx-onDurationTimer of a DRX group would not be
            running considering grants/assignments scheduled on Serving Cell(s) in this
            DRX group and DRX Command MAC CE/Long DRX Command MAC CE
            received until 4 ms prior to symbol n when evaluating all DRX Active Time
            conditions as specified in this clause; and
            4>  not report CSI on PUCCH in this DRX group.
    NOTE 4:            If a UE multiplexes a CSI configured on PUCCH with other overlapping
                      UCI(s) according to the procedure specified in TS 38.213 [6] clause 9.2.5 and
                      this CSI multiplexed with other UCI(s) would be reported on a PUCCH
                      resource outside DRX Active Time of the DRX group in which this PUCCH is
                      configured, it is up to UE implementation whether to report this CSI
                      multiplexed with other UCI(s).
Regardless of whether the MAC entity is monitoring PDCCH or not on the Serving Cells in
a DRX group, the MAC entity transmits HARQ feedback, aperiodic CSI on PUSCH, and
aperiodic SRS defined in TS 38.214 [7] on the Serving Cells in the DRX group when such
is expected.
The MAC entity needs not to monitor the PDCCH if it is not a complete PDCCH occasion
(e.g. the Active Time starts or ends in the middle of a PDCCH occasion).

Meanwhile, in sidelink communication, in the case of a UE used by a vulnerable road user (VRU) performing battery-based operation, since power saving through SL DRX is a very important technical factor for UE operation, DRX operation for sidelink communication may be required. In this case, the TX UE performing an SL DRX operation needs to wake-up the RX UE in SL DRX inactive to perform sidelink (SL) communication.

Based on an embodiment of the present disclosure, a method for performing mode 2 sensing while performing an SL DRX operation and an apparatus supporting the same are proposed. In the present disclosure, a "specific threshold value" may refer to a value pre-defined or pre-configured or configured by a network/higher layer. In the present disclosure, a "specific offset (value)" may be configured through RRC signaling of a higher layer. For example, "specific offset (value)" may be signaled through a MAC CE. For example, "specific offset (value)" may refer to a value signaled or configured through DCI.

Based on an embodiment of the present disclosure, between UEs not performing the SL DRX operation (hereinafter referred to as non-DRX UEs), transmission and reception may be performed not only in an inactive time duration but also in an active time duration within an SL DRX cycle. Therefore, for example, in order for transmission or SL resource selection in the active time duration, a UE performing the SL DRX operation (hereinafter referred to as SL DRX UE) may need to perform channel sensing for the mode 2 operation not only in the inactive time duration but also in the active time duration.

In this case, for example, an operation performed by the SL DRX UE during the active time duration and an operation performing channel sensing for the mode 2 operation may be configured with similar operations. For example, the DRX operation during the active time duration may include a $2^{nd}$ SCI decoding operation transmitted through a PSCCH and a PSSCH, and a PSSCH decoding operation if the UE detects a transport block (TB) transmitted to itself. In contrast, since the purpose of channel sensing is to detect channel resource occupancy due to transmission and reception between different UEs, only PSCCH decoding may be performed. Accordingly, the channel sensing operation may consume much less power than the SL DRX operation.

Based on an embodiment of the present disclosure, in order to obtain a power saving gain, the UE may perform partial sensing in an off-duration or the inactive time duration that occupies a relatively long time domain within the SL DRX cycle. For example, in order to maximize the sensing reliability according to a short channel sensing duration, the UE may perform full sensing in an on-duration or the active time duration that occupies a relatively short time domain within the SL DRX cycle. For example, if the UE performs channel sensing only in the on-duration or the active time duration in order to maximize a power saving gain, the reliability of channel sensing may be significantly deteriorated because only sensing for a short time domain or a past time domain with respect to the time of TB generation may be performed.

Based on an embodiment of the present disclosure, a sensing operation in which the SL DRX UE can obtain a power saving gain without losing reliability in channel sensing may be as follows.

Based on an embodiment, if the transmission operation of the SL DRX UE is performed in the on-duration, the SL DRX UE may select an SL resource with a relatively high sensing reliability within the latter part of the on-duration since the SL resource can be selected within the latter part of the on-duration based on a sensing result of the former part. However, if the UE performs sensing only in the on-duration or the active time, the reliability of sensing may be relatively low in the case of the former part of the on-duration. To solve these problems, a sensing window for performing channel sensing may be configured for an inactive time domain that precedes the on-duration by a specific threshold in time. In this case, the sensing window may be pre-defined, or pre-configured or configured by a higher layer.

Based on an embodiment, if a sensing window for obtaining sufficient reliability is not secured after the time of TB generation, the UE may shift the SL DRX on-duration or the SL DRX cycle by a specific offset in order to secure a sensing window within PDB related to the TB.

Based on an embodiment, as described above, if the SL DRX UE continues to perform sensing during the inactive time duration, the SL DRX UE may not be able to obtain a power saving gain compared to the non-DRX UE. Therefore, the SL DRX UE may not perform channel sensing based on the PSCCH decoding, and the SL DRX UE may perform sensing based on the power level (e.g., received signal strength indicator (RSSI)) of the received signal. For example, when selecting an SL transmission resource based on the RSSI-based sensing result, the SL DRX UE may exclude all candidate collision resources in which transmission resources may collide based on all possible SL resource periods configured in SL communication.

Based on an embodiment, if a time when a TB is generated by a higher layer is limited to the on-duration or the active time duration, the UE may perform channel sensing together with the DRX operation only in the on-duration or the active time duration, and the UE may perform TB transmission in the off-duration or the inactive time duration.

Based on an embodiment, a sensing window and a selection window may be configured within related PDB after a time when a TB to be transmitted is generated. For example, the length of the two windows may be pre-defined, or pre-configured or configured by the network/higher layer. For example, the ratio of the length between two windows within PDB may be pre-defined, or pre-configured or configured by the network/higher layer.

In this case, in order to perform the above-described sensing operation in the inactive time duration, a sensing timer may be configured in an SL DRX configuration. For example, during a period related to the sensing timer, the UE may perform a reception operation for SL DRX together with sensing for the mode 2 operation.

For example, for a service that needs to be transmitted urgently, such as URLLC, PDB may be very short after the time of TB generation. For example, in this case, the SL DRX UE may perform only random selection without performing channel sensing-based SL resource selection. Or, for example, the operation of performing only the random selection may be pre-defined, or pre-configured or configured for the UE by the network/higher layer.

Based on an embodiment of the present disclosure, in order to wake up the RX UE operating in SL DRX, the TX UE may transmit a wakeup indicator signal (WIS). In this case, an SL signal that can be used as the WIS may be as follows.

Based on an embodiment, the TX UE may transmit a PSCCH and $2^{nd}$ SCI transmitted through a PSSCH. For example, the TX UE may wake up a target UE (e.g., RX UE), based on a partial source ID and/or a partial destination ID obtained through decoding of the PSCCH and the $2^{nd}$ SCI transmitted through the PSSCH.

Based on an embodiment, the TX UE may transmit a WIS-dedicated PSCCH. For example, unlike the existing operation, the TX UE may use a PSCCH transmitting a full source ID and/or a full destination ID as the WIS for waking up the target UE (e.g., RX UE).

Based on an embodiment, the TX UE may transmit a dedicated sequence. For example, the TX UE may transmit a source ID and/or a destination ID, by using different sequences or by changing cyclic shifts of sequences generated based on the same generation polynomial.

Based on an embodiment, the TX UE may transmit an indicator field in $1^{st}$ SCI.

For example, the TX UE may transmit a WIS indicator field by using a reserved bit in the existing $1^{st}$ SCI field.

For example, the TX UE may signal whether a target UE to receive data transmitted through the corresponding PSCCH/PSSCH is the non-DRX UE (e.g., vehicle) or the SL DRX UE through the indicator field. For example, the indicator field may be signaled with 1 bit. Therefore, if the indicator field indicates that the target UE corresponds to the SL DRX UE, all SL DRX UEs receiving the indicator field should be able to receive additional transmissions by first waking up. For example, due to the above characteristics, the WIS signaling operation may be used in a broadcast mode.

For example, the UE may activate the on-duration, by the indicator field, configured after a time when the PSCCH is received. For example, the UE may activate the on-duration, by the indicator field, configured after a slot in which the PSCCH is transmitted. For example, the on-duration to be configured after the starting time of a slot in which the PSCCH is transmitted may be activated. For example, the on-duration to be configured after the last time of a slot in which the PSCCH is transmitted may be activated.

For example, if the indicator field indicates the SL DRX UE, the UE may obtain a partial source ID and/or a partial destination ID through $2^{nd}$ SCI decoding transmitted through a PSSCH, and based on this, if the UE itself is a target, the UE may activate the on-duration after the reception time of the PSCCH/PSSCH or the start or end time of a slot in which the PSCCH/PSSCH is transmitted.

For example, the SL slot in which the indicator field is transmitted may be an SL slot in which a PSCCH and only a PSSCH including only $2^{nd}$ SCI including a partial source ID and/or a partial destination ID are transmitted.

For example, the SL slot in which the indicator field is transmitted may be an SL slot in which a PSCCH and only a PSSCH including $2^{nd}$ SCI including a full source ID and/or a full destination ID are transmitted. For example, the SL slot in which the indicator field is transmitted may be an SL slot in which a PSCCH and only a PSSCH including only $2^{nd}$ SCI including a full source ID and/or a full destination ID are transmitted.

For example, if the SL DRX UE is indicated through the indicator field, the SL DRX UE may decode a full source ID and/or a full destination ID by decoding a MAC header. For example, if the UE corresponds to the target UE based on decoding a full source ID and/or a full destination ID, the on-duration may be activated after receiving the PSCCH/PSSCH. For example, if the UE itself corresponds to the target UE based on decoding a full source ID and/or a full destination ID, the on-duration may be activated after the start or end of a slot in which the PSCCH/PSSCH is transmitted.

For example, the SL slot in which the indicator field is transmitted may be an SL slot in which a PSCCH and only a PSSCH including only $2^{nd}$ SCI and MAC header are transmitted.

For example, the SL slot in which the indicator field is transmitted may be an SL slot in which a PSCCH and only a PSSCH including a MAC header including a full source ID and/or a full destination ID are transmitted. For example, the SL slot in which the indicator field is transmitted may be an SL slot in which a PSCCH and only a PSSCH including only a MAC header including a full source ID and/or a full destination ID are transmitted.

For example, the SL slot in which the indicator field is transmitted may be an SL slot in which a PSCCH and a PSSCH including a MAC CE including a full source ID and/or a full destination ID are transmitted. For example, the SL slot in which the indicator field is transmitted may be an SL slot in which a PSCCH and only a PSSCH including a MAC CE including a full source ID and/or a full destination ID are transmitted.

For example, the SL slot in which the indicator field is transmitted may be an SL slot in which a PSCCH including a full source ID and/or a full destination ID is transmitted. For example, the SL slot in which the indicator field is transmitted may be an SL slot in which only a PSCCH including a full source ID and/or a full destination ID is transmitted.

For example, the indicator field may include information based on a full source ID and/or a full destination ID. For example, the information based on the full source ID and/or the full destination ID may include a hash value of each ID, upper MSB bits of each ID, etc.

For example, a specific source ID and a specific destination ID may be configured through higher layer signaling such as RRC, and wake-up may be indicated by using the indicator field. For example, the ID configured by the RRC, etc. may be an ID of a counterpart UE (e.g., coordinating entity or coordinated UE) related to an inter-UE coordination operation. For example, the ID configured by the RRC, etc. may be an ID of a counterpart UE (e.g., relaying UE or relayed remote UE) related to an SL relaying operation. Or, for example, the ID configured by the RRC, etc. may be a group ID related to a platooning operation.

For example, the indicator field may be a discovery message itself in relation to a relay discovery operation. For example, the indicator field may be an indicator for a discovery message. For example, the relaying discovery message may be transmitted by using a reserved field in $2^{nd}$ SCI. As described above, the indicator field in the $1^{st}$ SCI may be used as indication signaling for a specific type of message. For example, a specific HARQ ID may be used as an indicator for the specific type of message.

Based on various embodiments of the present disclosure, the UE can obtain a power saving gain through efficient channel sensing performed by the UE performing the mode-2 operation in the SL DRX operation.

Based on an embodiment, in order to wake-up the RX UE operating in SL DRX, the TX UE may transmit a wakeup indicator signal (WIS) to the RX UE.

For example, an active time within an SL DRX cycle may be extended through the WIS or TB transmission.

Based on an embodiment, if the RX UE operating in SL DRX succeeds in receiving a retransmission TB, the RX UE may transmit HARQ ACK to the TX UE and may not restart an inactivity timer. Or, for example, if the RX UE operating in SL DRX succeeds in receiving a retransmission TB, the RX UE may transmit HARQ ACK to the TX UE and stop running of an inactivity timer.

Based on an embodiment, if the TX UE signals the total number of retransmission resources reserved or planned for specific TB transmission through $1^{st}$ SCI or $2^{nd}$ SCI, the RX UE performing the SL DRX operation may set or adjust an inactivity timer in proportion to the number of times. For example, if the TX UE signals the total number of retransmissions remaining for specific TB transmission through $1^{st}$ SCI or $2^{nd}$ SCI, the RX UE performing the SL DRX operation may set or adjust an inactivity timer in proportion to the number of times.

Based on an embodiment, the UE may signal the end time of transmission and retransmission of a specific TB through $1^{st}$ SCI or $2^{nd}$ SCI.

Based on an embodiment, if the TX UE performs additional new TB transmission within a specific threshold after receiving HARQ ACK for a specific TB from the RX UE, the TX UE may extend the active time of the RX UE by transmitting the WIS to the RX UE. For example, if the TX UE performs additional new TB transmission within a specific threshold after the last retransmission resource, the TX UE may extend the active time of the RX UE by transmitting the WIS to the RX UE. For example, if the RX UE operating in SL DRX receives the WIS, the RX UE may extend the currently configured active time (e.g., restart an inactivity timer or a retransmission timer).

Based on an embodiment, if an inactivity timer of the RX UE is expected to expire before a retransmission end time related to a specific TB of the TX UE, the TX UE may perform the operation of extending the active time described above by transmitting the WIS to the RX UE. For example, the RX UE may transmit information related to the end time of the currently configured active time to the TX UE through HARQ feedback, etc.

Based on an embodiment, in an inter-UE coordination operation, the TX UE may select SL resources through random selection or partial sensing and perform transmission. In this case, if conflicts continue to occur on the selected resources, the RX UE may transmit a signal for triggering normal sensing or full sensing in on-duration to the TX UE.

Meanwhile, in the SL DRX operation, if a target UE is identified based only on a partial destination ID transmitted through $2^{nd}$ SCI, ambiguity related to a full destination ID may occur. In this case, for example, if the UE determines that it is the target UE through decoding of the $2^{nd}$ SCI, the UE may extend the active time by restarting an inactivity timer or a retransmission timer. Thereafter, the UE may decode a full destination ID through decoding of a MAC header. Thereafter, if the UE finally determines that it is not the target UE, the UE may stop the running inactivity timer or retransmission timer. Or, for example, if the UE determines that it is not the target UE, the UE may not restart the inactivity timer or the retransmission timer.

For example, in the above case, the UE may shift an SL DRX cycle by a time period for resource(s) reserved by SCI information including the full destination ID. Or, for example, the UE may pause/hold the inactivity timer or the retransmission timer by a time period for resource(s) reserved by SCI information including the full destination ID.

Based on an embodiment, in the case of the unicast operation, if both a partial source ID and a partial destination ID transmitted through $2^{nd}$ SCI are used in combination, the probability of misinterpreting it as another UE ID may be very low since this is an operation for a UE pair already establishing PC5-RRC. Accordingly, in the case of unicast, based on determining whether the UE is a target UE by combining both the partial source ID and the partial destination ID transmitted through the $2^{nd}$ SCI, the UE may extend the active time. For example, in the case of groupcast or broadcast, the target UE determination may be performed based on a full source ID and/or a full destination ID transmitted by a MAC header.

Based on an embodiment, if HARQ feedback is enabled, the UE may determine a target UE through a HARQ process ID together with a source ID and/or a destination ID, and the UE may extend the active time according to the determination result.

For example, the monitoring occasion of the WIS may be pre-configured, or configured or pre-configured by a network/higher layer. For example, the TX UE may signal the location of a subsequent on-duration in time through the WIS, by using a timing offset from the time of the WIS, etc., and the TX UE may signal wake-up activation/deactivation. For example, the TX UE may signal the location of a subsequent on-duration in time through the WIS, by using a timing offset with respect to the time of the WIS. For example, the TX UE may signal wake-up activation/deactivation through the WIS. The RX UE may activate/deactivate the on-duration at a specific location based on the values signaled by the WIS.

Based on various embodiments of the present disclosure, in the SL DRX operation, a power saving gain can be obtained by effectively extending the active time of the SL DRX cycle based on the WIS.

Based on an embodiment, the non-DRX UE may configure an SL DRX cycle configuration to be used by the SL DRX UE through inter-UE coordination (hereinafter referred to as IUC), based on information related to channel sensing and resource selection performed by the non-DRX UE. In this case, the information on the SL DRX cycle configuration may include at least one of an SL DRX cycle period and offset, an SL DRX on-duration timer, an SL DRX inactivity timer, an SL DRX retransmission timer, an SL DRX HARQ RTT timer, or an SL DRX short cycle period and offset.

Based on an embodiment, the non-DRX UE or the DRX UE may configure the SL DRX cycle configuration to be used by other DRX UEs through UE-common IUC. For example, the non-DRX UE or the DRX UE may configure the SL DRX cycle configuration to be used by other DRX UEs through SL service common IUC. For example, the SL DRX cycle configuration to be used by other DRX UEs may be pre-defined or configured by a network or a higher layer. For example, the non-DRX UE or the DRX UE may configure the SL DRX cycle configuration to be used by other DRX UEs based on IUC through a configured fallback SL slot or sub-channel.

Based on an embodiment, if a UE-A configures a UE-B through IUC, information exchanged between the UE-A and the UE-B may include the following information. The exchanged information may include at least one of SL resource information preferred or excluded by the UE-A or the UE-B, an SL DRX on-duration preferred or excluded by the UE-A or the UE-B, an active time duration preferred or excluded by the UE-A or the UE-B, an off-duration preferred or excluded by the UE-A or the UE-B, an inactive time duration preferred or excluded by the UE-A or the UE-B, an index for a pre-configured table entry (e.g., the table entry has the above-described information as a component), an index for a table entry configured by a network or a higher layer, information related to the WIS preferred or excluded by the UE-A or the UE-B (e.g., information on when to wake-up, signaling wake-up activation/deactivation for the time), or a partial sensing duration preferred or excluded by the UE-A or the UE-B (e.g., sensing duration and an interval between sensing durations).

Based on an embodiment, if the SL DRX UE-A performs periodic transmission through semi-persistent scheduling (SPS) resources, a DRX cycle period used by the SL DRX UE-A may be set to match the resource period. For example, the on-duration or the active time may be set to include a period in which transmission resources are actually configured. In this case, for example, if there is another UE-C other than the counterpart UE-B performing SL communication by using the SPS resources, and a PSCCH transmitted by the UE-C to the UE-A is detected during the on-duration or the active time duration, the UE-A may generate a separate SL DRX cycle and may perform the DRX operation for a PSCCH/PSSCH transmitted by the UE-C.

Based on an embodiment, if the PSCCH of the UE-C is detected, the UE-A may use an inactivity timer or a retransmission timer related to the SL DRX cycle currently being used. Through this, the UE-A may extend the SL DRX cycle such that it can also receive a PSCCH/PSSCH transmitted by the UE-C to the UE-A.

Based on an embodiment, if the PSCCH of the UE-C is detected, in order to avoid the case in which power consumption increases due to the SL DRX cycle, the UE-A may transmit HARQ NACK for PSCCH/PSS CH transmission transmitted by the UE-C to the UE-C and may not perform PSSCH decoding.

For example, the above-described operation may operate in relation to a power consumption capability of the UE-A. For example, if power consumption by receiving a PSCCH/PSSCH transmitted by the UE-C is within the range allowed by the capability, the UE-A may receive the PSCCH/PSSCH transmitted by the UE-C by using a separate DRX cycle or by extending the current DRX cycle. For example, if the capability exceeds the range allowed by the capability, the UE-A may transmit HARQ NACK to the UE-C and may not perform PSSCH decoding.

Based on an embodiment, the UE-A may transmit and share power consumption capability information related to the maximum power consumption allowed by the UE-A to neighboring UEs through a PSCCH (SCI) or a PSSCH (MAC CE). In addition, the UE-A may transmit and share information related to the amount of power currently consumed by the UE-A (e.g., an index for a power consumption level pre-defined, or pre-configured or configured by a network or a higher layer) through the PSCCH (SCI) or the PSSCH (MAC CE).

Based on an embodiment, neighboring UEs of the UE-A may select an operation of performing or not performing additional transmission to UE-A, based on information on power consumption capability shared by the UE-A and information on the amount of power currently consumed.

For example, whether or not to perform additional transmission to the UE-A may be determined based on a layer-1 priority or a logical channel priority related to SL transmission transmitted by the neighboring UE-C of the UE-A. For example, if a priority of the type related to SL communication currently being performed by the UE-A is higher than a priority of the type related to SL communication to be transmitted by the UE-C, the UE-C may drop additional transmission to the UE-A. Otherwise, the UE-C may perform additional transmission to the UE-A.

Based on an embodiment, if the priority related to SL transmission packets transmitted or received between the UE-A and the UE-B is higher than a priority of transmission to the UE-A by the UE-C detected during the on-duration or the active time duration of the UE-A, the UE-A may transmit HARQ NACK to the UE-C and may not perform PSSCH decoding transmitted by the UE-C. For example, if a priority related to transmission of the UE-A is lower than a priority related to transmission of the UE-C, the UE-A may receive SL packets transmitted by the UE-C by using a separate DRX cycle or by extending the current DRX cycle.

Based on an embodiment, as in the case described above, if a priority related to transmission between the UE-A and the UE-B is lower than a priority related to transmission from the UE-C to the UE-A, and the power consumption capability of the UE-A is reached, the UE-A may drop an SL DRX cycle-based operation for communication with the UE-B that is currently being performed. In addition, by generating an SL DRX cycle for communication with the UE-C, the UE-A may receive a PSCCH/PSSCH transmitted from the UE-C.

Based on an embodiment, operations in which resource selection is performed only during the on-duration or the active time duration may be shown in Tables 14 and 15.

TABLE 14

Given resource selection triggering time at slot m (a new TB arrived),
- If m is within on-duration
  - ■ Sensing window
    - ♦ Previous active time(s)
      - • Sufficient amount but possibly out-of-dated
    - ♦ Current on-duration only before m
      - • Most reliable but possibly insufficient
    - ♦ Sensing window before on-duration
      - • sensing window overlapping with on-duration
      - • Sensing window right before on-duration
      - • Considering m during inactive time, sensing should be always performed?
  - ■ Resource selection window
    - ♦ If PDB is larger than the active time duration
      - • Selection window right after on-duration
        - ■ Possible conflict with other UE's TX in active time
        - ■ Possible half duplex issue during the inactivity/retransmission timer
          - ♦ Only unused resources are candidate for resource selection
          - ♦ Possibly insufficient candidate resources for selection
      - • Selection window right after the active time
        - ■ Less conflict with other UE's TX in active time
        - ■ No half duplex issue
        - ■ Possibly insufficient candidate resources for selection if PDB is small
    - ♦ Else if PDB is larger than on-duration but smaller than active time
      - • Possible half-duplex within inactivity/retransmission timer
      - • Resource selection on no-TX duration (e.g. intra/inter one CG/DG occasion)
    - ♦ Else (PDB is smaller than on-duration)
      - • Half-duplex problem
      - • Either PSCCH detection or TX operation is dropped
        - ■ Prioritization based on priority, cast type
        - ■ Either PSCCH detection or TX operation is always prioritized Table 15 is an example of the case where slot m is not located in the inactivity/retransmission timer.

TABLE 15

- Else if m is within inactivity/retransmission timer
  - ■ Sensing window
    - ♦ Previous active time(s)
      - • Sufficient amount but possibly out-of-dated
    - ♦ Current on-duration & active time before m
      - • Most reliable but possibly insufficient
      - • On-duration only common for all UEs
      - • On-duration as default sensing window
        - ■ Sensing window extension to inactivity/retransmission timer
    - ♦ Sensing window before on-duration
      - • sensing window overlapping with on-duration
      - • Sensing window right before on-duration
      - • Considering m during inactive time, sensing should be always performed?
  - ■ Resource selection window
    - ♦ If PDB is larger than the active time duration
      - • Resource selection window during inactive time - no half duplex issue TABLE 15-continued

- • Possibly insufficient candidate resources for selection
    - ◆ Else (PDB is smaller than active time)
        - • Possible half-duplex within inactivity/retransmission timer
        - • Resource selection on no-TX duration (e.g. intra/inter one CG/DG occasion)
- • Else (m is within inactive time)
    - ■ Sensing window
        - ◆ Active time(s) in previous DRX cycle(s)
            - • Sufficient amount but possibly out-of-dated
        - ◆ Active time in current DRX cycle
            - • . Possibly not sufficient if active time duration is relatively short
            - • Possibly not reliable if active time is out-of-dated
        - ◆ Active/inactive time in previous/current DRX cycle
            - • Most reliable but high power consumption (almost same as normal sensing)
        - ◆ Active/inactive time in current DRX cycle only
            - • Most reliable but possibly insufficient amount
    - ■ Resource selection window
        - ◆ If PDB includes on-duration of next DRX cycle
            - • Resource selection window during inactive time
            - • Possibly insufficient candidate resources for selection
        - ◆ Else (PDB is within current inactive time)
            - • Resource selection during inactive time
- • TB generation time constraint?
    - ■ If UE is operating in DRX mode
        - ◆ TB generation or buffered TB output is aligned with SL DRX cycle
            - • TB is delivered to MAC right after on-duration or active time
            - • PDB is set to include inactive time close to active time
- • If m is periodic, DRX cycle is shifted so as to be above (DRX cycle offset)

Meanwhile, the impact of SL DRX on mode-1 operation may be as follows.

As for the possible impact of SL DRX on the mode-1 operation, one issue may be whether the timing of SL resources configure by the network is included in the active time of SL DRX cycle. For example, it may depend on whether the SL DRX UE's transmission during the inactive time is allowed or not. If it's allowed, it is up to network implementation whether or not to locate the configured SL resources on the active time or the inactive time.

For example, if SL DRX UE's transmission during the inactive time is not allowed, or UE wants to save power by avoiding wake-up during the inactive time, there may be possible ways to achieve this goal. For example, one option may be to shift the configured SL DRX cycle so that the configured SL resources are scheduled to be on the active time of the SL DRX cycle. For example, the other option may be to report to the network the SL DRX cycle that UE uses for SL transmission, if the SL DRX cycle is not the one configured by the network (e.g., COD can be configured by the network, and an individual SL DRX cycle can be autonomously selected by a UE). Upon receiving the reported SL DRX cycle of the UE, the network can adjust the configured SL resource timing so that the SL resources are scheduled to be on the active time of the SL DRX cycle.

Another issue of mode-1 is the alignment between the Uu link DRX and the SL DRX active times. If two DRX active times fully overlap, the power saving gain of the UE will be maximized. But this may cause more frequent collisions between UL and SL transmission/reception. If two DRX active times do not overlap at all, such transmission/reception collision will never occur, but it may require more power consumption as UE should wake up during a longer period (that is, the sum of Uu link DRX and SL DRX active times). There may be two options for this non-overlapping case. For example, one option may be to locate two DRX cycle active times adjacent each other in time domain. This option, to some extent, may be beneficial in power consumption perspective as UE can keep waking up once it wakes up during either active time. For example, the other option may be to separate two active times by a distance in time domain. This may be beneficial in that the SL DRX operation does not interfere with the Uu link communication, which is discussed in more detail in the interference due to SL DRX as below. For example, as a compromise, both DRX active times may partially overlap, and the collision rate and the UE power saving level will be moderate.

For example, for communication between mode-1 DRX UE and mode-2 DRX UE, mode 1 DRX UE can share the SL DRX cycle information configured by the network with the mode-2 DRX UE. Then mode-2 DRX UE can adapt its own SL DRX cycle to that of the shared SL DRX cycle of the mode-1 UE. The vice versa may also work. That is, the mode-2 DRX UE may share its own SL DRX cycle information with the mode-1 DRX UE, then the mode-1 DRX UE may report the shared DRX cycle information to the network. As a result, the network can configure the SL DRX cycle to be used by the mode-1 DRX as adapted to that of the mode-2 DRX UE.

Another issue concerning the SL DRX cycle alignment may happen between two SL DRX UEs that have RRC connection with different cells. As each cell may configure the SL DRX cycle independently from other cell, SL DRX cycle information sharing between two kinds of DRX UEs would be helpful for communication between them.

For example, for power saving of the UE operating on a shared carrier, some level of overlapping between the Uu link DRX active time and the SL DRX active time can be considered. If two kinds of active time overlap each other, the SL DCI can be scheduled to be transmitted on the overlapping time duration.

If SL DRX UE's transmission and reception is limited only to the active time duration, the network can schedule SL grant so that mode-1 CG period is same as the SL DRX cycle period. In addition, the timing of the first resource of CG and DG resource occasion may be scheduled to be included in ON duration. The rest of resources or the retransmission resources can be scheduled to be on the active time.

Meanwhile, WIS can be considered to be used for step-wise SCI decoding for power saving. One example of such WIS functionality may be to use one reserved field in the $1^{st}$ SCI to indicate either a vehicle type (bit=0) or a power saving type (bit=1) of a UE. If the WIS bit indicates that the target UE is a power saving UE (P-UE), then all the P-UE that detected this $1^{st}$ SCI continue to receive and decode the $2^{nd}$ SCI carried by PSSCH. With the partial ID information in the $2^{nd}$ SCI, the target UE can further be identified so as to continue decoding over the TB. If the WIS bit indicates that the target UE is a vehicle UE (V-UE), then P-UE can skip further decoding the $2^{nd}$ SCI as the packet is not targeted for P-UE. This kind of step-wise decoding approach can efficiently save DRX-UE power consumption with using a single bit.

Meanwhile, interference due to SL DRX may be as follows. For example, when UL and SL transmission occur in a shared carrier, SL DRX operation may cause some level of interference to Uu link operation. The interference may be generated by the creation and the termination of the SL transmission according to the SL DRX cycle. In RAN4 discussion, this kind of interference due to RF on and off may be problematic even for the inter-band case. Considering the interference caused by RF on and off, as described above, it would be better not to configure the active and the inactive time switching so frequently. That is, the short gap between the active and the inactive time of SL DRX cycle may cause unnecessary interference to Uu link communication. For example, if the gap is expected to be too short, it would be better to maintain the active time duration once activated until the next active time duration coming shortly, to minimize such interference.

Based on various embodiments of the present disclosure, a power saving gain can be obtained by configuring the SL DRX cycle configuration using an inter-UE coordination technique for the SL DRX UE.

Figure 8:
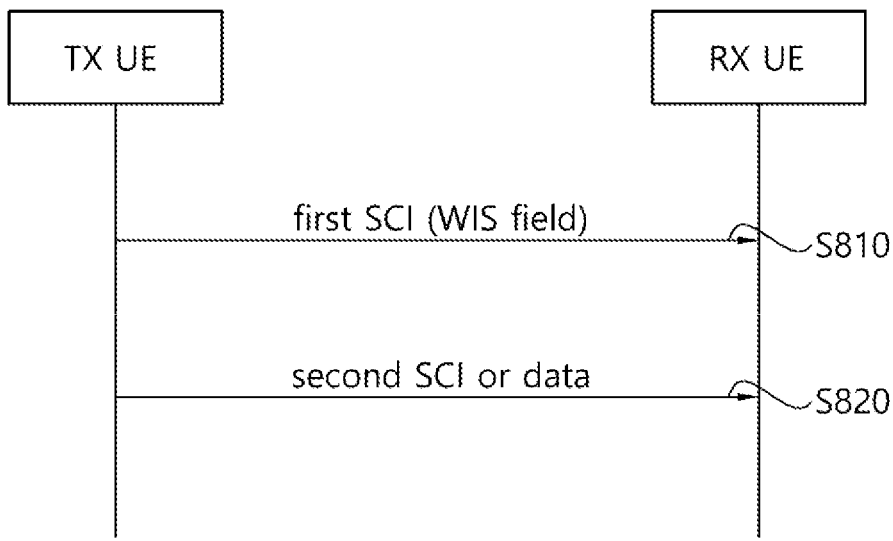
FIG. 8 shows a procedure for transmitting a WIS by a transmitting UE to a receiving UE, based on an embodiment of the present disclosure.
Figure 9:
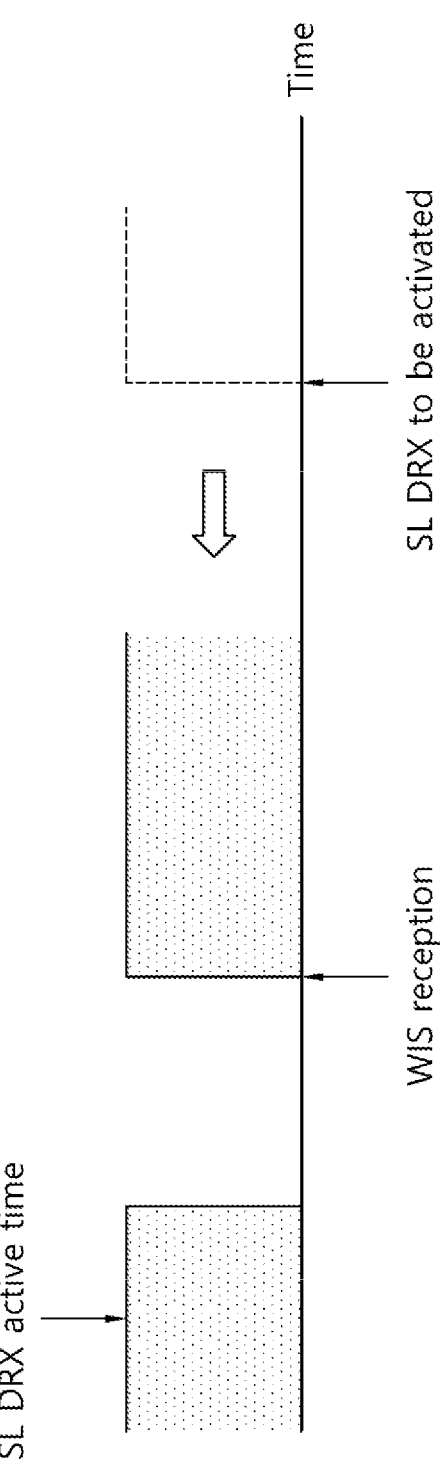
FIG. 9 shows an example in which a UE activates an active time based on a WIS, based on an embodiment of the present disclosure.

FIG. 8 shows a procedure for transmitting a WIS by a transmitting UE to a receiving UE, based on an embodiment of the present disclosure. FIG. 9 shows an example in which a UE activates an active time based on a WIS, based on an embodiment of the present disclosure. The embodiments of FIGS. 8 and 9 may be combined with various embodiments of the present disclosure.

Referring to FIG. 8, in step S810, the transmitting UE may transmit, to the receiving UE, first sidelink control information (SCI) including information for scheduling a physical sidelink shared channel (PSSCH), through a physical sidelink control channel (PSCCH). For example, the first SCI may include a wake-up indicator signal (WIS) field. For example, an active time related to SL DRX may be activated based on the WIS field. For example, the WIS field may be 1 bit. For example, the transmitting UE may inform receiving UE that it is the target of the SL DRX through the WIS field.

In step S820, the transmitting UE may transmit second SCI or data to the receiving UE through the PSSCH.

For example, the active time may be activated after a slot for the PSCCH.

For example, sensing may be performed for the entire sensing duration within the active time related to the SL DRX, and sensing may be performed for a part of the sensing duration within an inactive time related to the SL DRX.

For example, the second SCI may include at least one of a source ID or a destination ID. For example, the second SCI may include at least one of a part of a source ID or a part of a destination ID. For example, decoding may be performed for a part of the source ID or a part of the destination ID based on the WIS field. For example, the active time related to the SL DRX may be extended based on that the target of at least one of a part of a source ID or a part of the destination ID is the receiving UE. For example, the active time related to the SL DRX may be extended by the decoding. For example, based on that the target of at least one of the entire source ID or the entire destination ID is another UE through MAC header decoding, the active time extended for the receiving UE may be changed to an inactive time.

For example, the active time related to the SL DRX may be extended, based on that the target of either the entire source ID or the entire destination ID is the receiving UE through MAC header decoding.

For example, the active time related to the SL DRX may be extended, based on that the receiving UE is the target of the SL DRX based on either a part of a source ID or a part of a destination ID and a HARQ process ID.

For example, the WIS field may include information based on at least one of a source ID or a destination ID. For example, the WIS field may include at least one of a hash value for at least one of a source ID or a destination ID, or most significant bits (MSBs) for at least one of a source ID or a destination ID.

For example, a signal for triggering a sensing operation for an entire sensing duration may be received from the receiving UE to the transmitting UE.

For example, in an active time related to the SL DRX, sensing may be performed for the entire sensing duration. For example, in an inactive time related to the SL DRX, sensing may be performed for a part of the sensing duration. For example, sensing for a part of the sensing duration may be performed based on a sensing timer related to the SL DRX. For example, the sensing duration may be located in a time domain before a threshold from the on-duration related to the SL DRX.

For example, sensing for selecting resources related to SL transmission may be performed based on received signal strength indicator (RSSI). For example, based on a result of the sensing and periods related to all SL resources, SL resources that can collide may be excluded from resources related to the SL transmission.

For example, a source ID and a destination ID may be configured for the receiving UE through higher layer signaling.

For example, the source ID and the destination ID may be one of an ID of a counterpart UE related to an operation for coordination between UEs, an ID of a counterpart UE related to an SL relay operation, or a group ID.

Referring to FIG. 9, in case that the receiving UE operates in the inactive time related to the SL DRX, the receiving UE may receive the first SCI including the WIS field from the transmitting UE through the PSCCH. For example, in relation to the receiving UE's own SL DRX cycle, the receiving UE may receive the WIS from the transmitting UE during the inactive time before the time when the SL DRX is scheduled to be activated (e.g., the start time of the SL DRX on-duration period).

For example, the receiving UE may perform activation related to the SL DRX based on receiving the WIS. That is, the receiving UE may wake up and operate in the SL DRX active time based on receiving the WIS. Herein, for example, the WIS may be included in the first SCI. For example, the receiving UE may activate an active time related to the SL DRX after a slot in which the PSCCH including the WIS is received.

Figure 10:
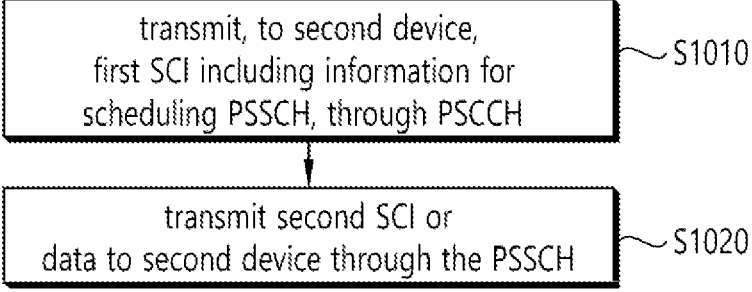
FIG. 10 shows a method of transmitting a wake-up indicator signal (WIS) by a first device to a second device, based on an embodiment of the present disclosure.

FIG. 10 shows a method of transmitting a wake-up indicator signal (WIS) by a first device to a second device, based on an embodiment of the present disclosure. The embodiment of FIG. 10 may be combined with various embodiments of the present disclosure.

Referring to FIG. 10, in step S1010, the first device 100 may transmit, to the second device 200, first SCI including information for scheduling a PSSCH, through a PSCCH. For example, the first SCI may include a wake-up indicator signal (WIS) field. For example, an active time related to SL DRX may be activated based on the WIS field. For example, the WIS field may be 1 bit.

In step S1020, the first device 100 may transmit second SCI or data to the second device 200 through the PSSCH.

For example, the active time may be activated after a slot for the PSCCH.

For example, sensing may be performed for the entire sensing duration within the active time related to the SL DRX, and sensing may be performed for a part of the sensing duration within an inactive time related to the SL DRX.

For example, the second SCI may include at least one of a source ID or a destination ID. For example, the second SCI may include at least one of a part of a source ID or a part of a destination ID. For example, decoding may be performed for a part of the source ID or a part of the destination ID based on the WIS field. For example, the active time related to the SL DRX may be extended based on that the target of at least one of a part of the source ID or a part of the destination ID is the second device 200. For example, the active time related to the SL DRX may be extended by the decoding. For example, based on that the target of at least one of the entire source ID or the entire destination ID is a third device through MAC header decoding, the extended active time for the second device 200 may be changed to an inactive time.

For example, based on that the target of either the entire source ID or the entire destination ID is the second device 200 through MAC header decoding, the active time related to the SL DRX may be extended.

For example, based on that the second device 200 is the target of the SL DRX based on either a part of a source ID or a part of a destination ID and a HARQ process ID, the active time related to the SL DRX may be extended.

For example, the WIS field may include information based on at least one of a source ID or a destination ID. For example, the WIS field may include at least one of a hash value for at least one of a source ID or a destination ID, or most significant bits (MSBs) for at least one of a source ID or a destination ID.

For example, a signal for triggering a sensing operation for the entire sensing duration may be received from the second device 200 to the first device 100.

For example, in an active time related to the SL DRX, sensing may be performed for the entire sensing duration. For example, in an inactive time related to the SL DRX, sensing may be performed for a part of the sensing duration. For example, sensing for a part of the sensing duration may be performed based on a sensing timer related to the SL DRX. For example, the sensing duration may be located in a time domain before a threshold from the on-duration related to the SL DRX.

For example, sensing for selecting resources related to SL transmission may be performed based on received signal strength indicator (RSSI). For example, based on a result of the sensing and periods related to all SL resources, SL resources that can collide may be excluded from resources related to the SL transmission.

For example, a source ID and a destination ID may be configured for the second device (200) through higher layer signaling.

For example, the source ID and the destination ID may be one of an ID of a counterpart UE related to an operation for coordination between UEs, an ID of a counterpart UE related to an SL relay operation, or a group ID.

The proposed method can be applied to the device(s) based on various embodiments of the present disclosure. First, for example, the processor 102 of the first device 100 may control the transceiver 106 to transmit, to the second device 200, first SCI including information for scheduling a PSSCH, through a PSCCH. In addition, for example, the processor 102 of the first device 100 may control the transceiver 106 to transmit second SCI or data to the second device 200 through the PSSCH.

Based on an embodiment of the present disclosure, a first device adapted to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a second device, first sidelink control information (SCI) including information for scheduling a physical sidelink shared channel (PSSCH) through a physical sidelink control channel (PSCCH); and transmit, to the second device, second SCI or data through the PSSCH. For example, the first SCI may include a wake-up indicator signal (WIS) field. For example, an active time related to sidelink (SL) discontinuous reception (DRX) may be activated based on the WIS field.

Based on an embodiment of the present disclosure, an apparatus adapted to control a first user equipment (UE) may be provided. For example, the apparatus may comprise: one or more processors; and one or more memories operably connected to the one or more processors and storing instructions. For example, the one or more processors may execute the instructions to: transmit, to a second UE, first sidelink control information (SCI) including information for scheduling a physical sidelink shared channel (PSSCH) through a physical sidelink control channel (PSCCH); and transmit, to the second UE, second SCI or data through the PSSCH. For example, the first SCI may include a wake-up indicator signal (WIS) field. For example, an active time related to sidelink (SL) discontinuous reception (DRX) may be activated based on the WIS field.

Based on an embodiment of the present disclosure, a non-transitory computer-readable storage medium storing instructions may be provided. For example, the instructions, when executed, may cause a first device to: transmit, to a second device, first sidelink control information (SCI) including information for scheduling a physical sidelink shared channel (PSSCH) through a physical sidelink control channel (PSCCH); and transmit, to the second device, second SCI or data through the PSSCH. For example, the first SCI may include a wake-up indicator signal (WIS) field. For example, an active time related to sidelink (SL) discontinuous reception (DRX) may be activated based on the WIS field.

Figure 11:
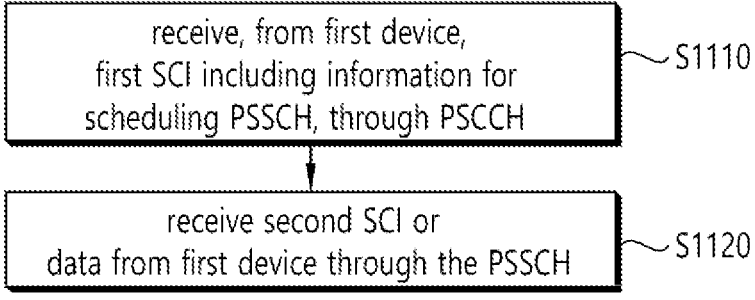
FIG. 11 shows a method for receiving a wake-up indicator signal (WIS) by a second device from a first device, based on an embodiment of the present disclosure.

FIG. 11 shows a method for receiving a wake-up indicator signal (WIS) by a second device from a first device, based on an embodiment of the present disclosure. The embodiment of FIG. 11 may be combined with various embodiments of the present disclosure.

Referring to FIG. 11, in step S1110, the second device 200 may receive, from the first device 100, first sidelink control information (SCI) including information for scheduling a physical sidelink shared channel (PSSCH), through a physical sidelink control channel (PSCCH). For example, the first SCI may include a wake-up indicator signal (WIS) field. For example, an active time related to SL DRX may be activated based on the WIS field. For example, the WIS field may be 1 bit.

In step S1120, the second device 200 may receive second SCI or data from the first device 100 through the PSSCH.

For example, the active time may be activated after a slot for the PSCCH.

For example, sensing may be performed for the entire sensing duration within the active time related to the SL DRX, and sensing may be performed for a part of the sensing duration within an inactive time related to the SL DRX.

For example, the second SCI may include at least one of a source ID or a destination ID. For example, the second SCI may include at least one of a part of a source ID or a part of a destination ID. For example, decoding may be performed for a part of the source ID or a part of the destination ID based on the WIS field. For example, based on that the target of at least one of a part of the source ID or a part of the destination ID is the second device 200, the second device 200 may extend the active time related to the SL DRX. For example, the active time related to the SL DRX may be extended by the decoding. For example, based on that the target of at least one of the entire source ID or the entire destination ID is the third device through MAC header decoding, the second device 200 may change the extended active time to an inactive time.

For example, based on that the target of either the entire source ID or the entire destination ID is the second device 200 through MAC header decoding, the second device 200 may extend the active time related to the SL DRX.

For example, based on that the second device 200 is the target of the SL DRX based on either a part of a source ID or a part of a destination ID and a HARQ process ID, the second device 200 may extend the active time related to the SL DRX.

For example, the WIS field may include information based on at least one of a source ID or a destination ID. For example, the WIS field may include at least one of a hash value for at least one of a source ID or a destination ID, or most significant bits (MSBs) for at least one of a source ID or a destination ID.

For example, the second device 200 may transmit a signal for triggering a sensing operation for the entire sensing duration to the first device 100.

For example, in an active time related to the SL DRX, sensing may be performed for the entire sensing duration. For example, in an inactive time related to the SL DRX, sensing may be performed for a part of the sensing duration. For example, sensing for a part of the sensing duration may be performed based on a sensing timer related to the SL DRX. For example, the sensing duration may be located in a time domain before a threshold from the on-duration related to the SL DRX.

For example, sensing for selecting resources related to SL transmission may be performed based on received signal strength indicator (RSSI). For example, based on a result of the sensing and periods related to all SL resources, SL resources that can collide may be excluded from resources related to the SL transmission.

For example, a source ID and a destination ID may be configured for the second device (200) through higher layer signaling.

For example, the source ID and the destination ID may be one of an ID of a counterpart UE related to an operation for coordination between UEs, an ID of a counterpart UE related to an SL relay operation, or a group ID.

The proposed method can be applied to the device(s) based on various embodiments of the present disclosure. First, for example, the processor 202 of the second device 200 may control the transceiver 206 to receive, from the first device 100, first sidelink control information (SCI) including information for scheduling a physical sidelink shared channel (PSSCH), through a physical sidelink control channel (PSCCH). In addition, for example, the processor 202 of the second device 200 may control the transceiver 206 to receive second SCI or data from the first device 100 through the PSSCH.

Based on an embodiment of the present disclosure, a second device adapted to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device, first sidelink control information (SCI) including information for scheduling a physical sidelink shared channel (PSSCH) through a physical sidelink control channel (PSCCH); and receive, from the first device, second SCI or data through the PSSCH. For example, the first SCI may include a wake-up indicator signal (WIS) field. For example, an active time related to sidelink (SL) discontinuous reception (DRX) may be activated based on the WIS field.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 12:
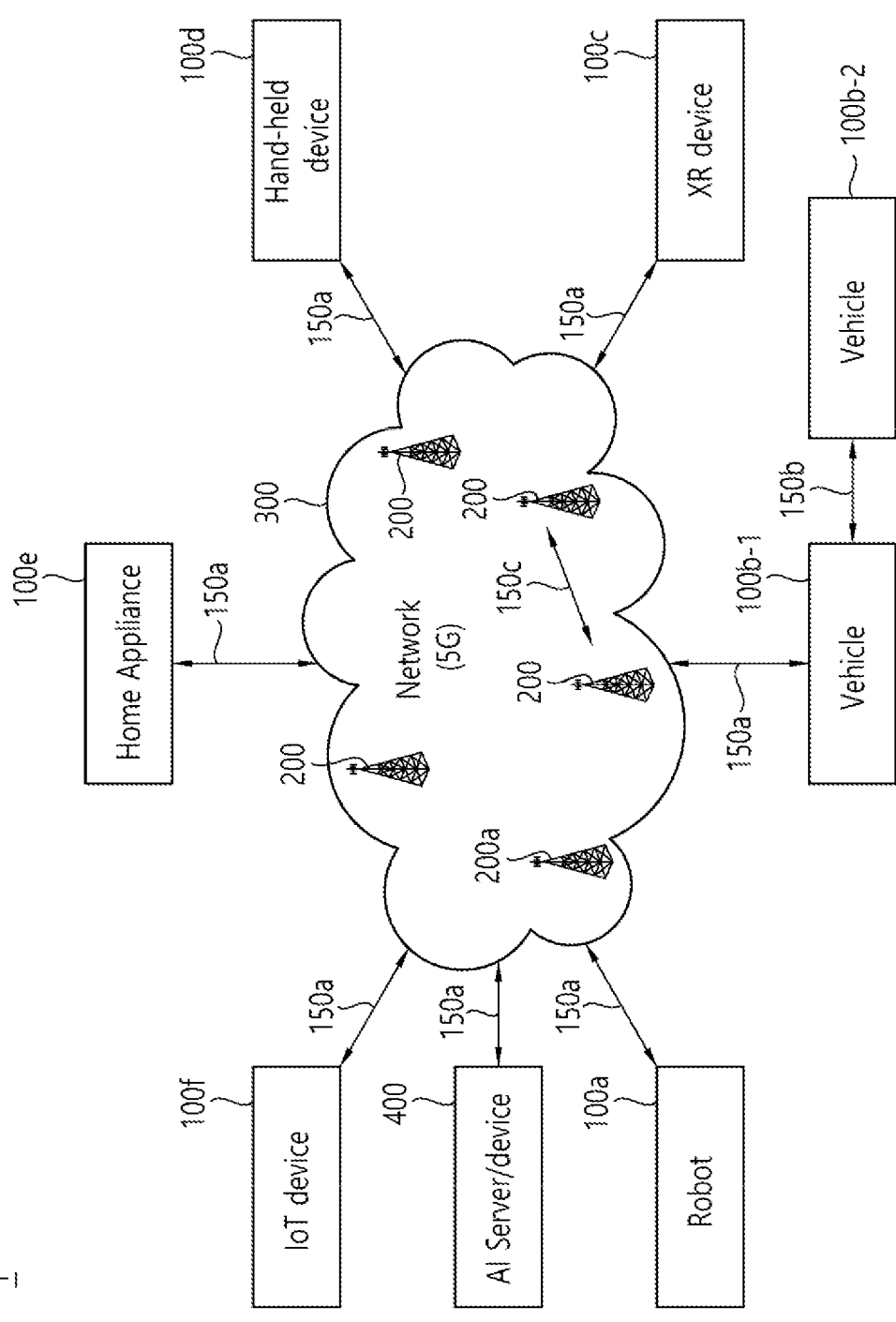
FIG. 12 shows a communication system 1, based on an embodiment of the present disclosure.

FIG. 12 shows a communication system 1, based on an embodiment of the present disclosure. The embodiment of FIG. 12 may be combined with various embodiments of the present disclosure.

Referring to FIG. 12, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT)

device 100*f*, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

Here, wireless communication technology implemented in wireless devices 100*a* to 100*f* of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100*a* to 100*f* of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100*a* to 100*f* of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BS s/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
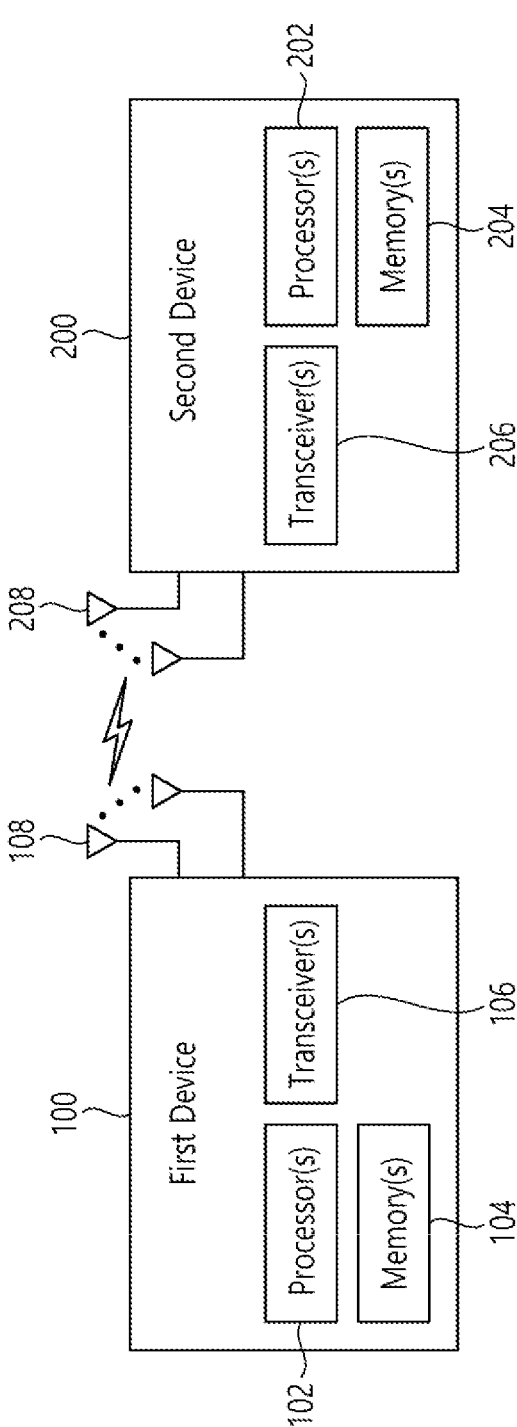
FIG. 13 shows wireless devices, based on an embodiment of the present disclosure.

FIG. 13 shows wireless devices, based on an embodiment of the present disclosure. The embodiment of FIG. 13 may be combined with various embodiments of the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
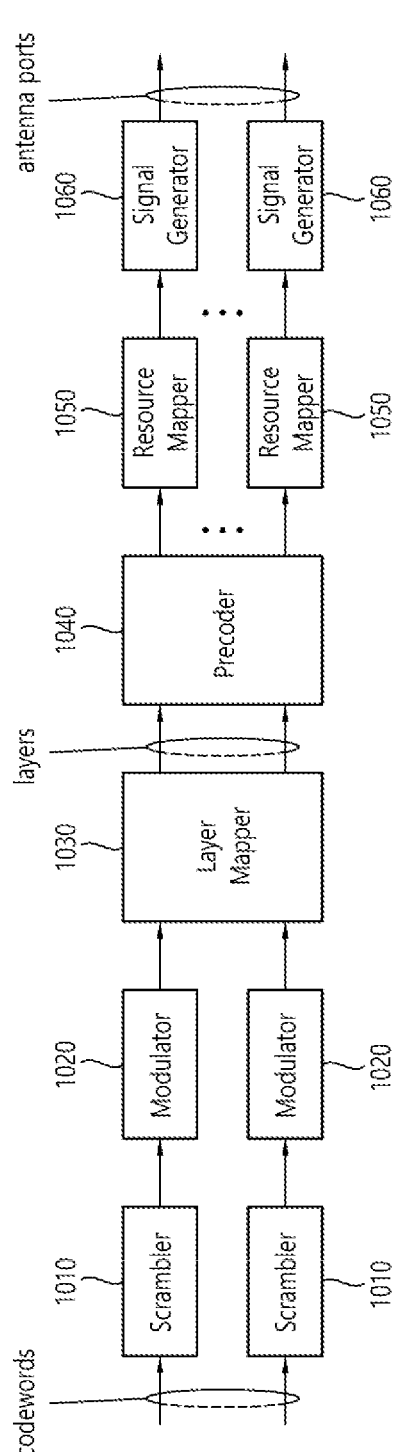
FIG. 14 shows a signal process circuit for a transmission signal, based on an embodiment of the present disclosure.

FIG. 14 shows a signal process circuit for a transmission signal, based on an embodiment of the present disclosure. The embodiment of FIG. 14 may be combined with various embodiments of the present disclosure.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BP SK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

FIG. 15 shows another example of a wireless device, based on an embodiment of the present disclosure. The wireless device may be implemented in various forms according to a use-case/service (refer to FIG. 12). The embodiment of FIG. 15 may be combined with various embodiments of the present disclosure.

Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 12), the vehicles (100*b*-1 and 100*b*-2 of FIG. 12), the XR device (100*c* of FIG. 12), the hand-held device (100*d* of FIG. 12), the home appliance (100*e* of FIG. 12), the IoT device (100*f* of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

Figure 16:
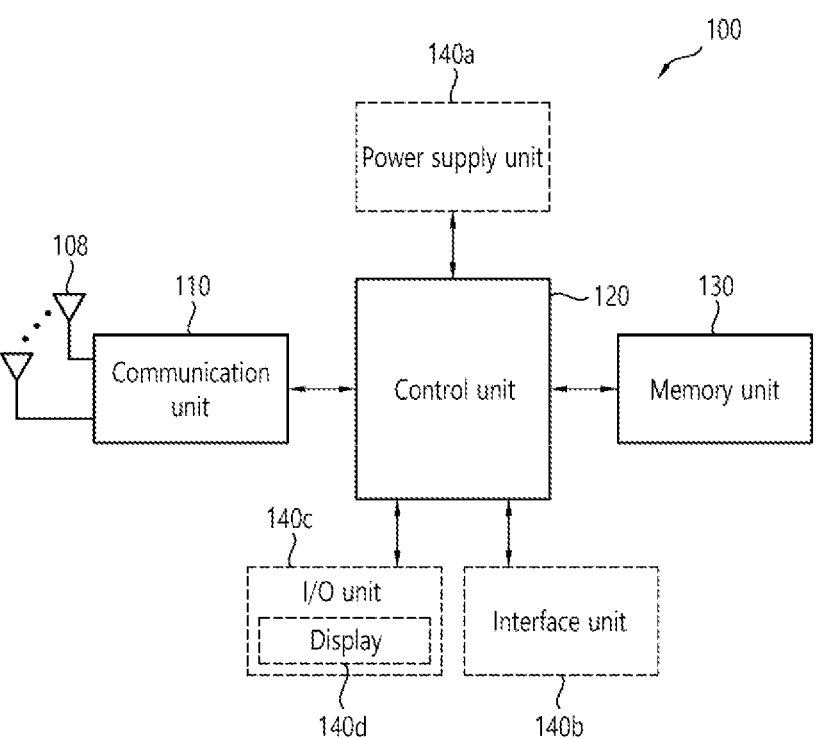
FIG. 16 shows a hand-held device, based on an embodiment of the present disclosure.

FIG. 16 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 16 may be combined with various embodiments of the present disclosure.

Referring to FIG. 16, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 17 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 17 may be combined with various embodiments of the present disclosure.

Referring to FIG. 17, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method comprising:

transmitting, by a first device to a second device, first sidelink control information (SCI) including information for scheduling a physical sidelink shared channel (PSSCH) through a physical sidelink control channel (PSCCH); and transmitting, by the first device to the second device, second SCI or data through the PSSCH, wherein the first SCI includes a wake-up indication signal (WIS) field, wherein an active time related to sidelink (SL) discontinuous reception (DRX) is activated based on the WIS field, wherein, in the active time related to the SL DRX, sensing is performed for an entire sensing duration, wherein, in an inactive time related to the SL DRX, sensing is performed for a part of a sensing duration, wherein the WIS field is 1 bit, wherein a target of the SL DRX is informed to the second device through the WIS field, wherein the second SCI includes at least one of a part of a source ID or a part of a destination ID, wherein, based on the WIS field, decoding is performed for the part of the source ID or the part of the destination ID, wherein, based on that a target of at least one of the part of the source ID or the part of the destination ID is the second device, the active time related to the SL DRX is extended for the second device, and wherein, based on that a target of at least one of all of the source ID or all of the destination ID is a third device through MAC header decoding, the active time that was extended for the second device based on the part of the source ID or the part of the destination ID is changed to an inactive time.

2. The method of claim 1, wherein the active time is activated after a slot for the PSCCH.

3. The method of claim 1, wherein, based on that the second device is a target of the SL DRX based on either a part of a source ID or a part of a destination ID and a hybrid automatic repeat request (HARQ) process ID, the active time related to the SL DRX is extended.

4. The method of claim 1, wherein the WIS field includes at least one of a hash value for at least one of a source ID or a destination ID or most significant bits (MSBs) for at least one of the source ID or the destination ID.

5. The method of claim 1, wherein a signal for triggering a sensing operation for the entire sensing duration is received from the second device.

6. The method of claim 1, wherein the sensing for the part of the sensing duration is performed based on a sensing timer related to the SL DRX.

7. The method of claim 1, wherein the sensing duration is located in a time domain before a threshold from an on-duration related to the SL DRX.

8. The method of claim 1, wherein sensing for selecting resources related to SL transmission is performed based on received signal strength indicator (RSSI), and wherein SL resources that can collide are excluded from resources related to the SL transmission based on a result of the sensing and periods related to all SL resources.

9. A first device comprising:

at least one transceiver;

at least one processor; and at least one memory connected to the at least one processor and storing instructions that, based on being executed by the at least one processor, cause the first device to perform operations comprising:

transmitting, to a second device, first sidelink control information (SCI) including information for scheduling a physical sidelink shared channel (PSSCH) through a physical sidelink control channel (PSCCH); and transmitting, to the second device, second SCI or data through the PSSCH, wherein the first SCI includes a wake-up indication signal (WIS) field, wherein an active time related to sidelink (SL) discontinuous reception (DRX) is activated based on the WIS field, wherein, in the active time related to the SL DRX, sensing is performed for an entire sensing duration, wherein, in an inactive time related to the SL DRX, sensing is performed for a part of a sensing duration, wherein the WIS field is 1 bit, wherein a target of the SL DRX is informed to the second device through the WIS field, wherein the second SCI includes at least one of a part of a source ID or a part of a destination ID, wherein, based on the WIS field, decoding is performed for the part of the source ID or the part of the destination ID, wherein, based on that a target of at least one of the part of the source ID or the part of the destination ID is the second device, the active time related to the SL DRX is extended for the second device, and wherein, based on that a target of at least one of all of the source ID or all of the destination ID is a third device through MAC header decoding, the active time that was extended for the second device based on the part of the source ID or the part of the destination ID is changed to an inactive time.

10. The first device of claim 9, wherein the active time is activated after a slot for the PSCCH.

11. A processing device comprising:

at least one processor; and at least one memory connected to the at least one processor and storing instructions that, based on being executed by the at least one processor, cause a first device to perform operations comprising:

transmitting, to a second device, first sidelink control information (SCI) including information for scheduling a physical sidelink shared channel (PSSCH) through a physical sidelink control channel (PSCCH); and transmitting, to the second device, second SCI or data through the PSSCH, wherein the first SCI includes a wake-up indication signal (WIS) field, wherein an active time related to sidelink (SL) discontinuous reception (DRX) is activated based on the WIS field, wherein, in the active time related to the SL DRX, sensing is performed for an entire sensing duration, wherein, in an inactive time related to the SL DRX, sensing is performed for a part of a sensing duration, wherein the WIS field is 1 bit, wherein a target of the SL DRX is informed to the second device through the WIS field, wherein the second SCI includes at least one of a part of a source ID or a part of a destination ID, wherein, based on the WIS field, decoding is performed for the part of the source ID or the part of the destination ID, wherein, based on that a target of at least one of the part of the source ID or the part of the destination ID is the second device, the active time related to the SL DRX is extended for the second device, and wherein, based on that a target of at least one of all of the source ID or all of the destination ID is a third device through MAC header decoding, the active time that was extended for the second device based on the part of the source ID or the part of the destination ID is changed to an inactive time.

\*     \*     \*     \*     \*